US008659445B2

(12) United States Patent
Townsend, Jr.

(10) Patent No.: US 8,659,445 B2
(45) Date of Patent: *Feb. 25, 2014

(54) DEVICES, SYSTEMS AND METHODS FOR REINFORCING A TRAFFIC CONTROL ASSEMBLY

(71) Applicant: Robert E. Townsend, Jr., Royal Palm Beach, FL (US)

(72) Inventor: Robert E. Townsend, Jr., Royal Palm Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,894

(22) Filed: May 7, 2013

(65) Prior Publication Data
US 2013/0241380 A1 Sep. 19, 2013

Related U.S. Application Data

(63) Continuation-in-part of application No. 13/758,760, filed on Feb. 4, 2013, and a continuation-in-part of application No. 12/973,066, filed on Dec. 20, 2010, now Pat. No. 8,395,531, and a continuation-in-part of application No. 11/839,807, filed on Aug. 16, 2007, now Pat. No. 7,876,236.

(60) Provisional application No. 60/840,989, filed on Aug. 30, 2006, provisional application No. 60/842,258, filed on Sep. 5, 2006, provisional application No. 60/843,659, filed on Sep. 11, 2006, provisional application No. 60/860,082, filed on Nov. 20, 2006, provisional application No. 60/880,612, filed on Jan. 16, 2007, provisional application No. 60/923,933, filed on Apr. 17, 2007, provisional application No. 60/926,914, filed on Apr. 30, 2007, provisional application No. 60/927,620, filed on May 4, 2007, provisional application No. 61/690,861, filed on Jul. 6, 2012, provisional application No. 61/815,355, filed on Apr. 24, 2013.

(51) Int. Cl.
*G08G 1/095* (2006.01)

(52) U.S. Cl.
USPC ............................ 340/907; 174/41; 248/218.4

(58) Field of Classification Search
None
See application file for complete search history.

(56) References Cited

U.S. PATENT DOCUMENTS 2,925,458 A 2/1960 Lester
2,956,768 A 10/1960 Livingston
(Continued)

FOREIGN PATENT DOCUMENTS

CH 380818 9/1964
DE 1 489 510 4/1969
(Continued)

OTHER PUBLICATIONS

Florida Department of Transportation District 5 Maintaining Agencies Group, http://raj.oco.net/d5.html (and associated hyperlinks), last visited Jun. 18, 2007.

(Continued)

*Primary Examiner* — Bradley Duckworth
(74) *Attorney, Agent, or Firm* — Brinks Gilson & Lione

(57) ABSTRACT

Reinforcement devices and systems for holding a traffic control assembly in compression are provided. The traffic control assembly includes a traffic signal disconnect hanger and/or a traffic signal and a first span wire positioned above the traffic control assembly. In some embodiments, the reinforcement device includes an upper support device connected to the first span wire where the upper support device has a length that is greater than a width of the traffic control assembly and the upper support device is configured to spread the load of the traffic signal assembly to the first span wire. The reinforcement device includes a lower support device operably connected to the traffic signal, a first vertical support member, and a second vertical support member where the first and second vertical members are tensioned when the upper support device, the lower support device and the first and second vertical support members are connected together.

24 Claims, 29 Drawing Sheets

(56) References Cited

U.S. PATENT DOCUMENTS

| | | |
|---|---|---|
| 3,126,575 A | 3/1964 | Schoenberg |
| 3,334,197 A | 8/1967 | Boden et al. |
| 3,424,509 A | 1/1969 | Siklos |
| 3,571,791 A | 3/1971 | Parduhn |
| 3,639,752 A | 2/1972 | Appleton |
| 3,706,070 A | 12/1972 | Eikenberry |
| 3,764,099 A | 10/1973 | Parduhn |
| 3,888,446 A | 6/1975 | O'Brien et al. |
| 3,891,175 A | 6/1975 | Hawley et al. |
| 3,916,265 A | 10/1975 | Friedman |
| 3,952,978 A | 4/1976 | Reinitz |
| 3,977,641 A | 8/1976 | Garchinsky |
| 3,989,217 A | 11/1976 | Friedman |
| 3,991,400 A | 11/1976 | Buehler |
| 3,999,160 A | 12/1976 | McDonnell |
| 4,089,129 A | 5/1978 | Patterson, Jr. |
| 4,101,191 A | 7/1978 | Gould et al. |
| 4,117,456 A | 9/1978 | Albrecht |
| 4,142,173 A | 2/1979 | Gould et al. |
| 4,365,393 A | 12/1982 | Hauffe et al. |
| 4,369,429 A | 1/1983 | Souder |
| 4,449,348 A | 5/1984 | Jacobs |
| 4,460,142 A | 7/1984 | O'Rorke |
| 4,489,910 A | 12/1984 | Ferguson |
| 4,520,984 A | 6/1985 | Rouleau |
| D287,948 S | 1/1987 | Evans |
| 4,646,997 A | 3/1987 | Fadley |
| 4,659,046 A | 4/1987 | Parduhn |
| 4,676,275 A | 6/1987 | Hancock et al. |
| 4,763,870 A | 8/1988 | Wodlinger |
| 4,799,060 A | 1/1989 | Brugger |
| 4,860,985 A | 8/1989 | Olson et al. |
| 4,917,338 A | 4/1990 | Olson et al. |
| 5,069,416 A | 12/1991 | Ennis |
| 5,105,350 A | 4/1992 | Tolman et al. |
| 5,219,001 A | 6/1993 | Renmaker |
| 5,292,014 A | 3/1994 | Lelong |
| 5,299,773 A | 4/1994 | Bertrand |
| 5,340,069 A | 8/1994 | Niemeyer |
| 5,379,716 A | 1/1995 | Helland |
| 5,484,217 A | 1/1996 | Carroll et al. |
| 5,504,481 A | 4/1996 | Wys |
| 5,517,395 A | 5/1996 | Weissman |
| D379,756 S | 6/1997 | Parduhn |
| 5,642,740 A | 7/1997 | Chen |
| 5,645,255 A | 7/1997 | Parduhn |
| 5,715,881 A | 2/1998 | Ruskamp et al. |
| 5,879,780 A | 3/1999 | Kindinger et al. |
| 5,898,389 A | 4/1999 | Deese et al. |
| 5,964,444 A | 10/1999 | Guertler |
| 6,175,313 B1 | 1/2001 | Berezovsky |
| 6,357,709 B1 | 3/2002 | Parduhn |
| 6,685,154 B1 | 2/2004 | Blyth et al. |
| 6,707,393 B1 | 3/2004 | Moore |
| 6,859,980 B2 | 3/2005 | Baer |
| 6,896,226 B2 | 5/2005 | Heath |
| 6,911,915 B2 | 6/2005 | Wu et al. |
| 6,951,434 B2 | 10/2005 | Yodock, Jr. et al. |
| 6,969,548 B1 | 11/2005 | Goldfine |
| 7,006,011 B1 | 2/2006 | Colby |
| 7,258,314 B1 | 8/2007 | Parduhn et al. |
| 7,671,760 B2 | 3/2010 | Vallejo, Sr. |
| 7,997,546 B1 | 8/2011 | Andersen et al. |
| 2002/0023291 A1 | 2/2002 | Rowald et al. |
| 2002/0035765 A1 | 3/2002 | Baer |
| 2002/0043592 A1 | 4/2002 | Frazier |
| 2002/0043809 A1 | 4/2002 | Vismara |
| 2002/0160198 A1 | 10/2002 | Oshima et al. |
| 2003/0030173 A1 | 2/2003 | Oakey et al. |
| 2005/0189452 A1 | 9/2005 | Heath |
| 2011/0193277 A1 | 8/2011 | Christenson |
| 2012/0240498 A1 | 9/2012 | Hurlebaus et al. |
| 2013/0087672 A1 | 4/2013 | Townsend, Jr. |
| 2013/0095710 A1 | 4/2013 | Townsend, Jr. |

FOREIGN PATENT DOCUMENTS

| | | |
|---|---|---|
| EP | 1 329 301 A1 | 7/2003 |
| WO | WO 2013/059186 A1 | 4/2013 |

OTHER PUBLICATIONS

McDonald, J. et al., *Hurricanes Andrew and Iniki* 1992, EQE International, pp. 1-8.

Christenson, Richard E.; "Field Deployment of Signal Head Vibration Absorbers to Reducing Fatigue in Wind-Excited Traffic Signal Structures: A Project Proposed for the Transportation Pooled Fund Program"; Connecticut Department of Transportation; Downloaded from the Internet at http://www.google.com/url?sa=t&rct=j&q=&esrc=s&frm=1&source=web&cd=2&ved=0CDIQFjA.B&url=http%3A%2F%2Fwww.pooledfund.org%2FDocument%2FDownload%2F3332&ei=as.UcnOLdCsrgHL YGIAg&usg=AFQjCNEzIIevgBzdCrSmaJtNeT7uwylPg&sig2=t4ywvTBPemA.QCwTeboQvsw; 9 pages; Mar. 2012.

Combs, D.L. et al., *Deaths Related to Hurricane Andrew in Florida and Louisiana*, 1992, International Journal of Epidemiology, vol. 25. No. 3, pp. 537-544 (1996) (http://ije.oxfordjournals.org).

Cook, R.A. et al., Structures and Materials Research Report No. 96-2: "Structural Qualification Procedure for Traffic Signals and Signs," State of Florida, Department of Transportation (Jul. 1996) (http://www.dot.state.fl.us/research-center/Completed_Proj/Summary_STR/FDOT_731_rpt.pdf).

Hoover, A., "New Dampener Makes Traffic Light Poles Safer, Longer Lasting," University of Florida News (May 27, 1998) (http://news.ufl.edu/1998/05/27/litepole/).

Manual on Uniform Traffic Control Devices for Streets and Highways, 2003 Ed., U.S. Department of Transportation Federal Highway Administration; Introduction, Part 1 (General) and Part 4 (Highway Traffic Signals), manual available at http://mutcd.fhwa.dot.gov/kno_2003.htm.

Technical Memorandum: "Florida Department of Transportation Hurricane Response Evaluation and Recommendations," Version 5 (Feb. 11, 2005) (http://www.dot.state.fl.us/trafficoperations/pdf/HurricaneRprt.pdf).

Memorandum from Mayor Carlos Alvarez of Miami-Dade County to George Burgess, County Manager Re "Traffic Signals," Nov. 3, 2005.

Letter from Ronald A. Cook, University of Florida, to Lap T. Hoang, Florida Department of Transportation, Re "Hurricane Resistant Support System for Signals and Signs" (Jan. 26, 2006).

Gurley, K., et al., Presentation: "Workshop for Research in Electricity Infrastructure Hardening" (http://warrington.ufl.edu/purc/docs/presentation_2006Gurley.pdf).

Henson, C., et al., "Design Signal for Hurricane Wind—Lessons Learned and New Design," Session 24, Florida Dept. of Transportation (http://www.dot.state.fl.us/Structures/DesignConf2006/Presentations/session24/Final-24Henson.pdf).

Pavlov, A., Presentation: "Hurricane Damage to Transportation Structures—Lessons Learned—Design Changes," 2007 FDOT Construction Conference (http://www.dot.state.fl.us/construction/download/ConstConf07/Structures/StructuresHurrican Damage.ppt).

Florida Department of Transportation Research: "Development of Hurricane Resistant Cable Supported Traffic Signals BD545-57 (Nov. 2011)" (http://www.dot.state.fl.us/research-center/Completed_Proj/Summary_STR/FDOT_BD545_57.pdf).

Palm Beach County Typicals for 2010 Annual Signal Installation Contract, The Board of County Commissioners (http://www.pbcgov.com/engineering/traffic/pdf/signal_typicals.pdf).

APL Search Results, Approved Product List of Traffic Control Signals and Signal Devices (http://www3.dot.state.fl.us/traffic-controlproducts/) (Manufacturer: Engineered Casting, Inc.).

Cook, R.A. et al., Presentation: "Development of Hurricane Resistant Traffic Signal Support System," Florida Department of Transportation, University of Florida.

Faquir, T., Presentation: "FDOT Hurricane Preparation and Response Recommendations," Central Office Traffic Engineering and Operations Office, (http://www.dot.state.fl.us/TrafficOperations/Doc_Library/PDF/DTOE/TahiraFaquir.pdf).

(56) References Cited

OTHER PUBLICATIONS

Memorandum from Michael Velez to Lap Hoang Re "Support systems for traffic signals".

Minimum Specifications for Traffic Control Signal Devices, Section A601, "Traffic Control Signal Device Certification," pp. 1-3.

Minimum Specifications for Traffic Control Signal Devices, Section A659, "Signal Head Auxiliaries," pp. 22-24.

"Span Wire Free-Swinging Illuminated Sign Hardware Assemblies"; Cost Cast, Inc.; Initial Release, with drawing; Jul. 8, 2009; three pages.

Transportation Research Board, Project: "Development of Hurricane Resistant Traffic Signal Hangers and Disconnect Boxes".

Office Action dated Feb. 7, 2011 regarding U.S. Appl. No. 12/971,916.

Non-final Office Action for U.S. Appl. No. 12/971,938 mailed Aug. 24, 2011.

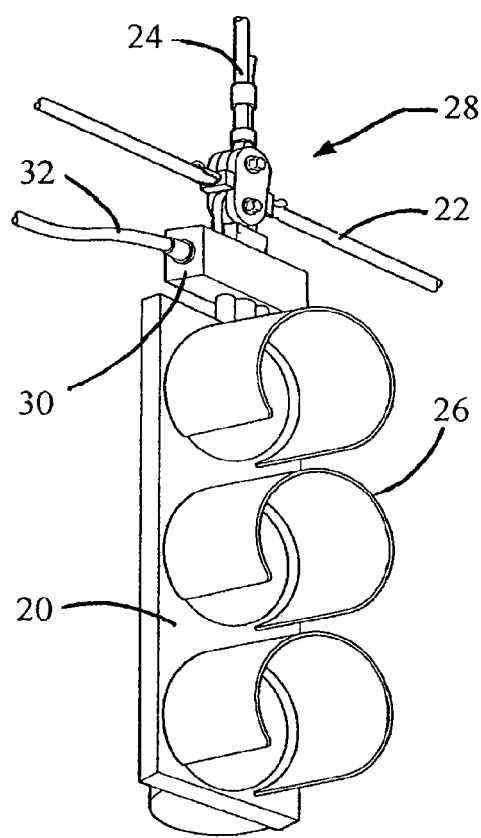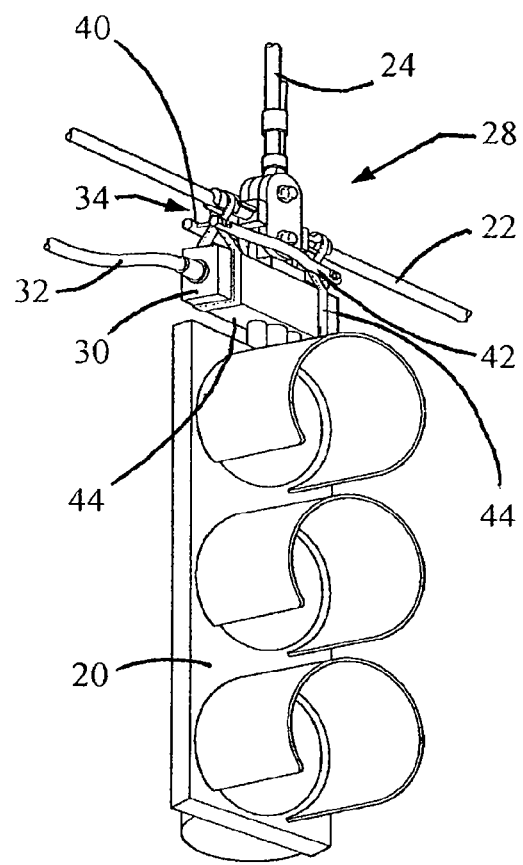
Fig. 1
(Prior Art)
Fig. 2

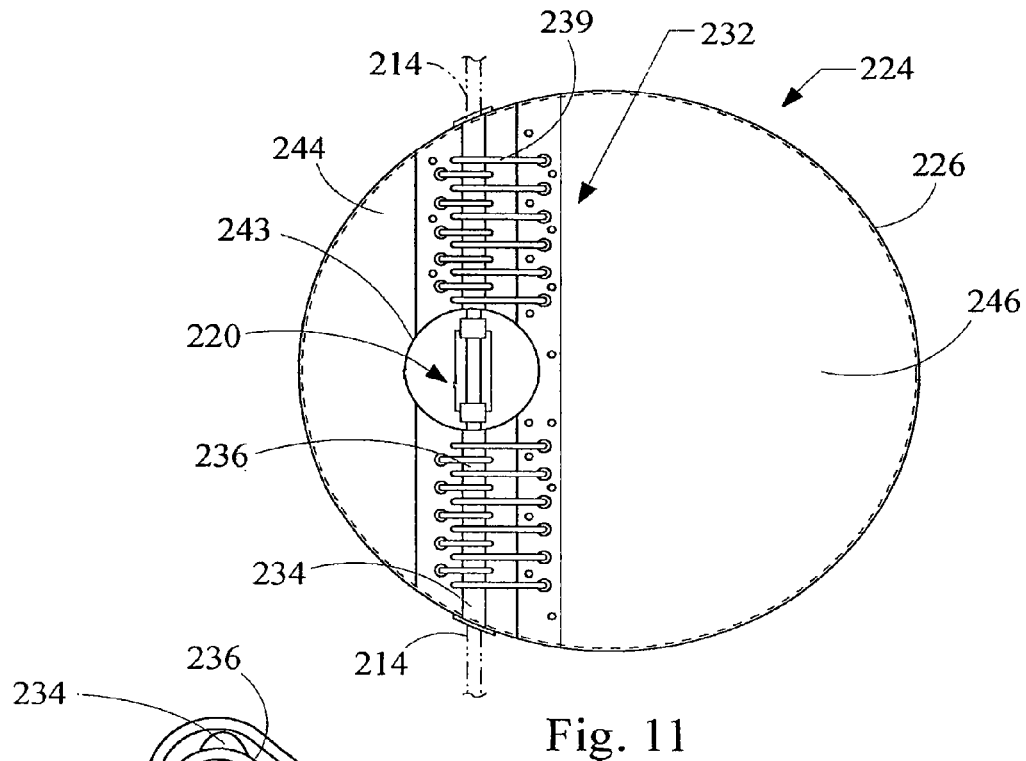
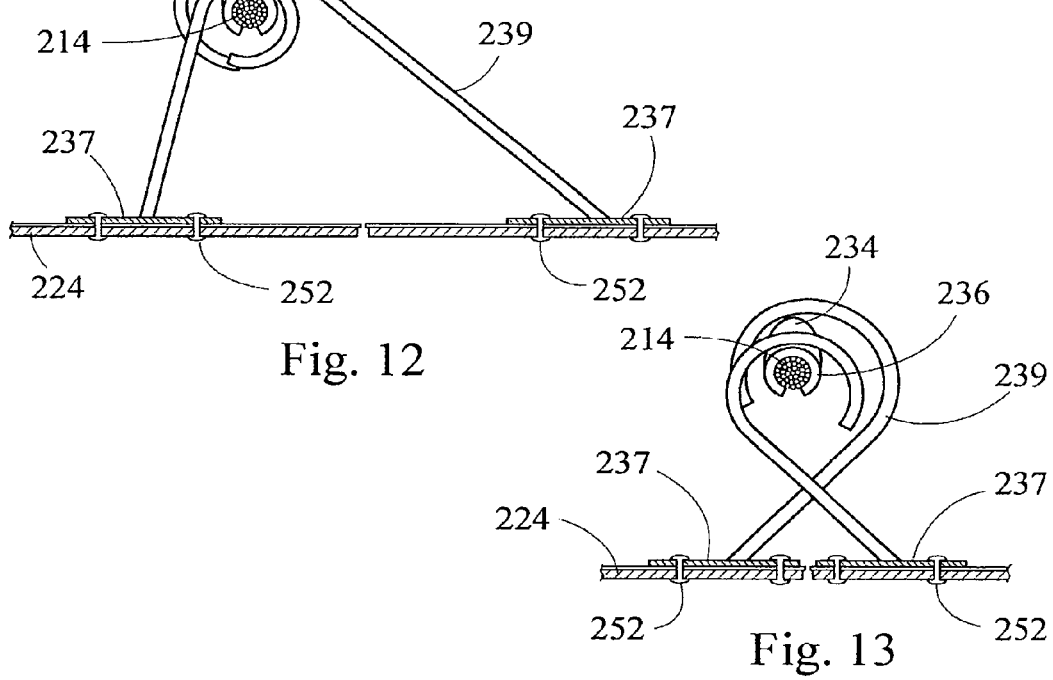
Fig. 11
Fig. 12
Fig. 13

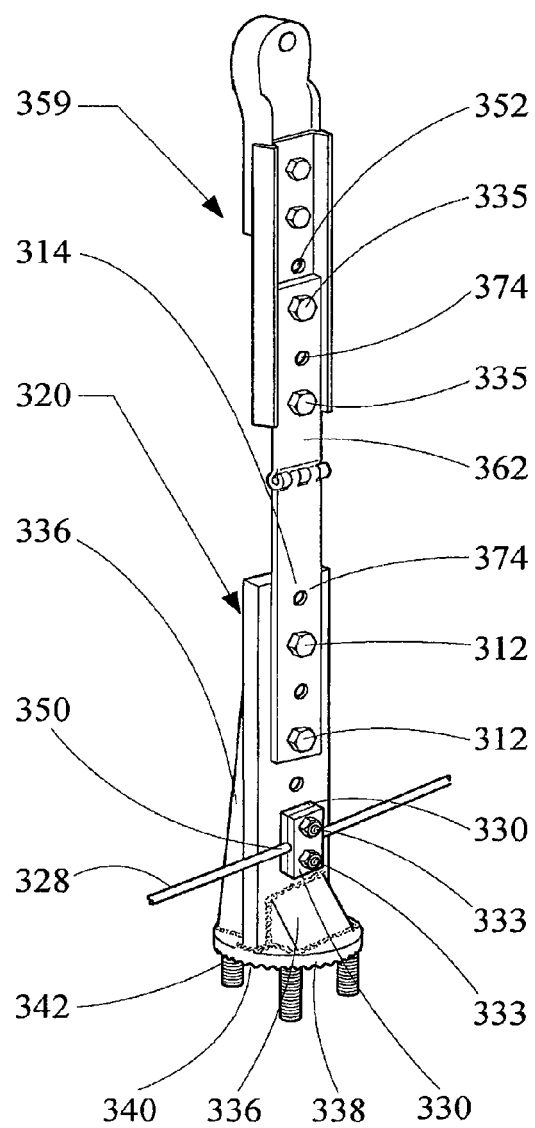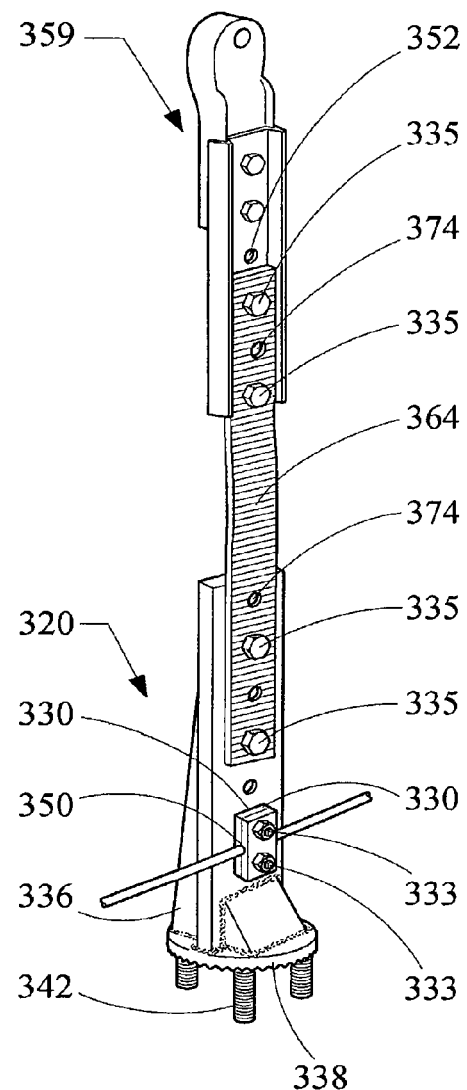
Fig. 19
Fig. 20

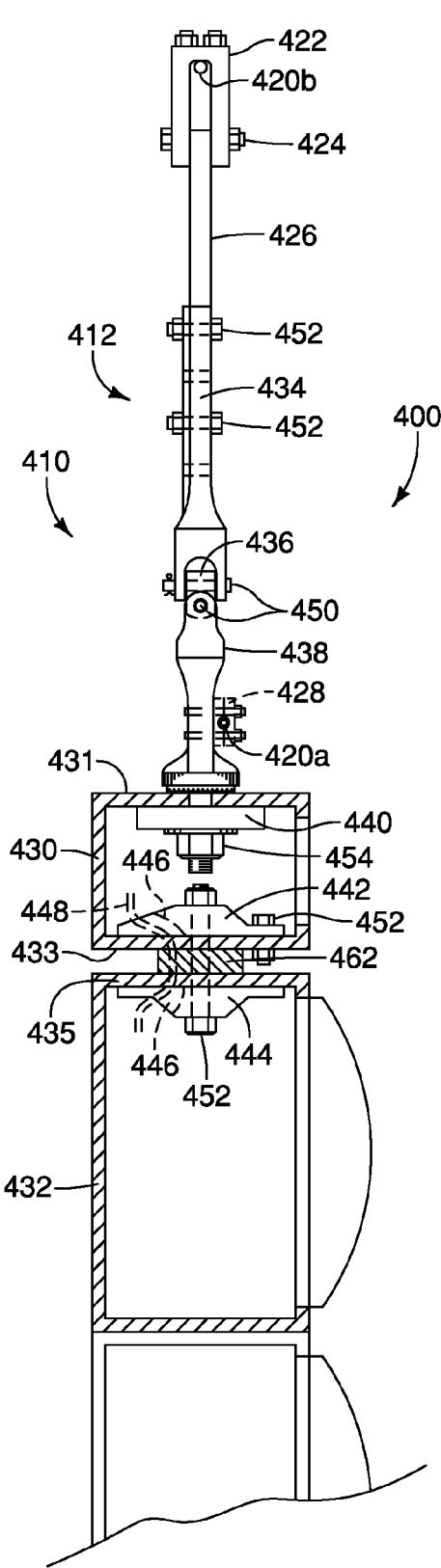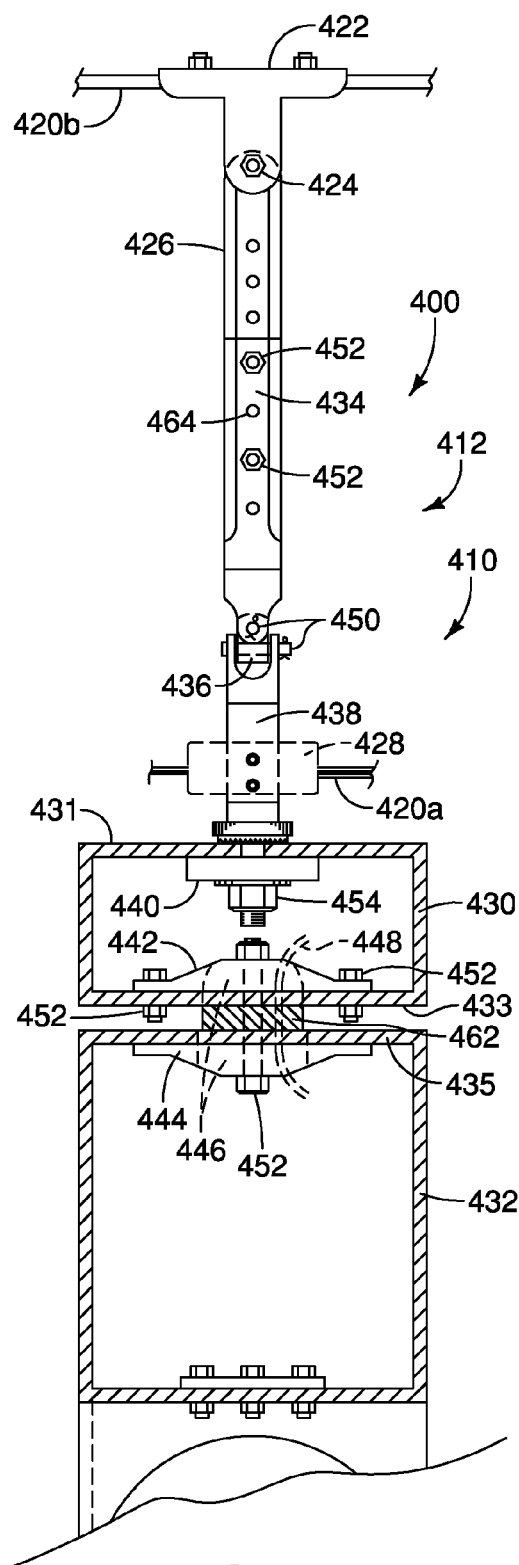
FIG. 21
FIG. 22

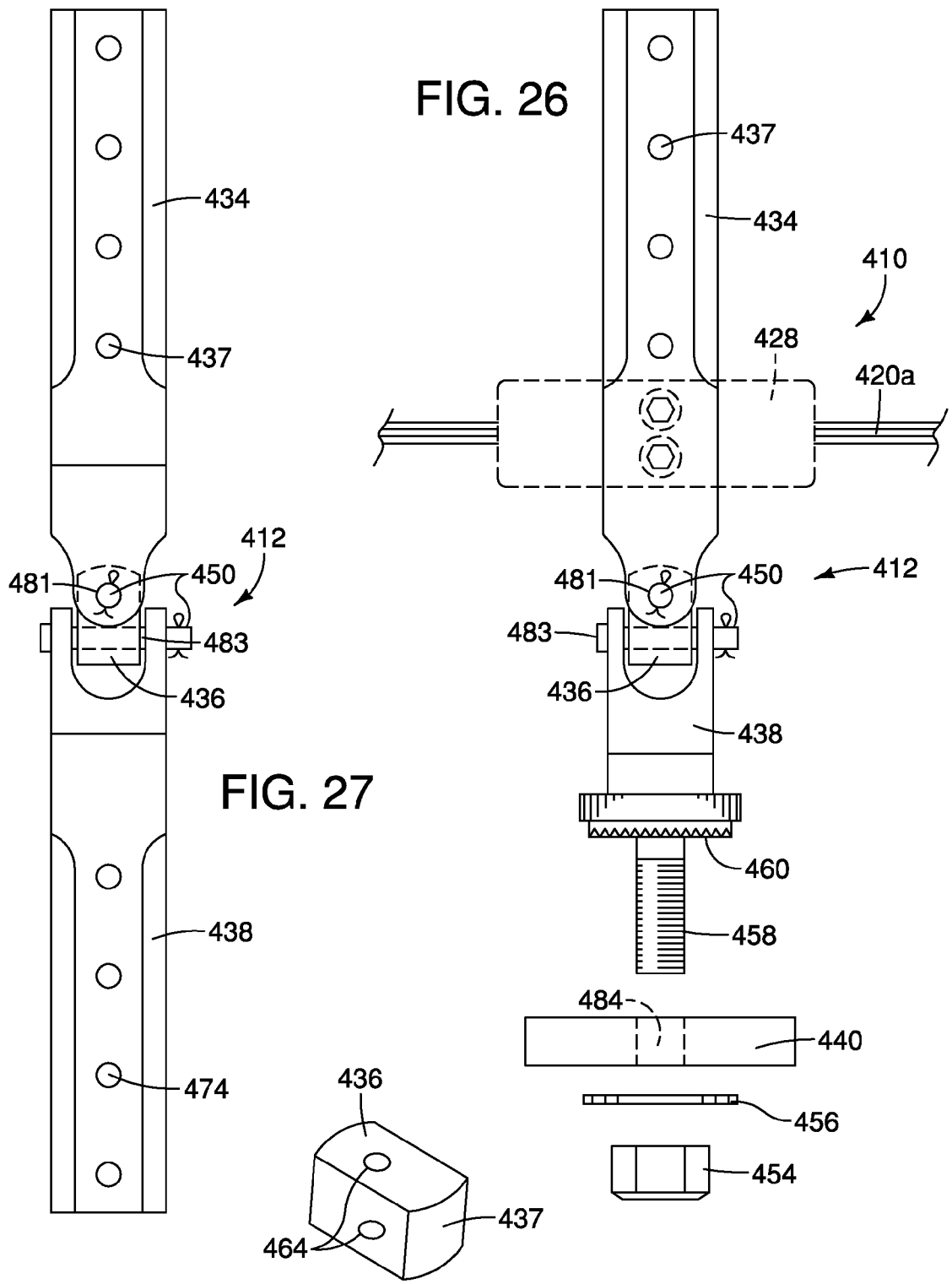

DEVICES, SYSTEMS AND METHODS FOR REINFORCING A TRAFFIC CONTROL ASSEMBLY

RELATED APPLICATIONS

This application is a continuation-in-part of U.S. application Ser. No. 13/758,760, filed Feb. 4, 2013, which is a continuation-in-part of U.S. application Ser. No. 12/973,066, filed Dec. 20, 2010, now U.S. Pat. No. 8,395,531, which is a continuation-in-part of U.S. application Ser. No. 11/839,807, filed Aug. 16, 2007, now U.S. Pat. No. 7,876,236, which claims the benefit of the filing date under 35 U.S.C. §119(e) of the following Provisional U.S. Patent Application Ser. Nos. 60/840,989, filed Aug. 30, 2006; 60/842,258, filed Sep. 5, 2006; 60/843,659, filed Sep. 11, 2006; 60/860,082, filed Nov. 20, 2006; 60/880,612, filed Jan. 16, 2007; 60/923,933, filed Apr. 17, 2007; 60/926,914, filed Apr. 30, 2007; 60/927,620, filed May 4, 2007; 61/690,861, filed Jul. 6, 2012 and 61/815,355 filed Apr. 24, 2013, all of which are hereby incorporated by reference in their entirety.

BACKGROUND

1. Technical Field

The present invention relates generally to traffic control assemblies. In particular, the present invention relates to devices, systems, and methods for reinforcing traffic control assemblies.

2. Background Information

Traffic control devices, such as traffic signals or signs, are often located above, by, or near sidewalks or roadways to assist pedestrians and drivers to safely and orderly pass through intersections. Sometimes such traffic control devices are unable to withstand heavy wind conditions. Therefore, it is not uncommon for traffic control devices to become detached from their support structures, or to become twisted or disoriented from their proper positions when exposed to adverse weather conditions such as the heavy winds that accompany high wind storm events or hurricanes. As a result, the pedestrians and drivers that the traffic control devices are designed to assist may be left without a safe and orderly way to pass through intersections, leaving the sidewalks and roadways in disarray, and substantially increasing the likelihood of traffic accidents and delays in emergency personnel response times. Moreover, traffic control devices that become detached from their support structures may pose a danger to nearby property and individuals, who may be struck by a falling traffic control device. Further, it can take many months to repair or replace all of the detached or damaged traffic control devices, at great effort and expense.

Although damage and detachment of traffic control devices may be avoided by removal of the devices prior to anticipated high wind conditions, the removal and subsequent reinstallation of these devices requires substantial effort and expense. In addition, the roadways and sidewalks can be hazardous until the removed devices are reinstalled.

Accordingly, there is a need for improved devices, systems, and methods for reinforcing traffic control assemblies so that such traffic control assemblies need not be removed from their associated support structures prior to high wind storm events or hurricanes. There is also a need for improved traffic control devices and systems that are able to withstand heavy wind conditions and avoid detachment, twisting, disorientation, or system failures, as well as the concomitant effects. In addition, there is a need for devices, systems, and methods for reliably and efficiently retrofitting existing traffic control devices so that existing traffic control devices can be reinforced or otherwise configured to withstand heavy wind conditions and prevent or resist detachment, twisting, disorientation, and system failures, without requiring expensive and labor-intensive installation of new traffic control devices or re-installation of existing traffic control devices that have been removed before, or that have become detached during, a high wind storm event or hurricane.

BRIEF SUMMARY

In some embodiments of the present invention, a system for retrofitting a traffic control assembly is provided. The system may include a clamping assembly for use with an existing traffic control assembly, where the traffic control assembly includes a traffic signal and a traffic signal disconnect hanger suspended beneath a span wire and connected to the traffic signal. The clamping assembly may include a clamping member and a bar member positioned substantially perpendicular to the clamping member and connected to the clamping member, where the clamping member at least partially surrounds the existing traffic signal disconnect hanger, and the clamping assembly is configured to reinforce the traffic signal disconnect hanger and connect the traffic signal to the span wire. In certain embodiments, the clamping assembly contains two clamping members and two bar members, where one clamping member is positioned near each end of the existing traffic signal disconnect hanger, and the two bar members are positioned substantially perpendicular to the clamping members and adjacent opposite sides of an existing signal head hanger assembly and/or span wire clamp assembly. In some embodiments, stiffening members may be placed in, on, or adjacent to the traffic signal and/or the traffic signal disconnect hanger to further reinforce the traffic signal assembly. Additional reinforcing devices, such as a connecting assembly incorporating a pivot point between a lower span wire and an upper span wire, may also be included.

In other embodiments of the present invention, a reinforcement device for retrofitting a traffic control assembly is provided, where the reinforcement device may include: a traffic signal containing a stiffening member; a traffic signal disconnect hanger containing a stiffening member; and a fastener connecting the two stiffening members together. The stiffening members may be made of any suitable material, such as cast aluminum or drop forged metal. The fastener may be any suitable fastening mechanism, such as an elongated bolt configured to pass through apertures in the stiffening members and may be secured with a lock washer and nut, for example.

In still other embodiments of the present invention, a connection assembly is provided for reducing the effect of high wind forces on a traffic control assembly. For example, a connection assembly may include a lower connection device attached to an upper connection device by means of a pivot pin, a hinged strap, or a flexible strap. The lower connection device may include, for example, a first portion connected to a lower span wire and supported by one or more supporting members, and an integral second portion positioned substantially perpendicularly to the first portion and configured to receive a pivot pin. In certain embodiments, the pivot pin, hinged strap, or flexible strap is positioned between a lower span wire and an upper span wire, thereby permitting structural movement in an area of the traffic control assembly that is prone to flexing, flexural failures, and damage during high wind events.

In yet other embodiments of the present invention, a method of reinforcing an existing traffic control assembly is provided, where an existing traffic signal assembly includes a traffic signal disconnect hanger suspended from a lower span wire, and a traffic signal connected to the traffic signal disconnect hanger. The method may include retrofitting an existing traffic signal assembly by securing the traffic signal disconnect hanger to the lower span wire with a clamping assembly, securing the traffic signal disconnect hanger to the traffic signal with a stiffening assembly, and/or installing a connecting device between the traffic signal disconnect hanger and an upper span wire located above the first span wire to facilitate flexing at points of potential failure. In some embodiments, the traffic signal is secured to the traffic signal disconnect hanger by attaching one stiffening plate to the traffic signal and another stiffening plate to the traffic signal disconnect hanger, and connecting the first stiffening plate to the second stiffening plate with a connecting member, such as an elongated bolt, lock washer, and nut. The two stiffening plates may be connected by placing an elongated bolt through a first aperture in the first stiffening plate, through a second aperture in the traffic signal head, a third aperture in the disconnect hanger/hub, and through a fourth aperture in the second stiffening plate. In other embodiments, the traffic control assembly also includes an upper connection device connected to a lower connection device with a pivot pin positioned between the lower span wire and the upper span wire. In certain embodiments, the lower connection device includes a first portion connected to the lower span wire and a second portion positioned substantially perpendicular to the first portion and configured to receive a pivot pin.

In still other embodiments, reinforcement devices for traffic control assemblies are provided. The reinforcement device may include a connecting device operably connected to and positioned above the traffic signal disconnect hanger and below the span wire. The connecting device may include an upper connection device operably connectable to the span wire, a lower connection device operably connected to the upper connection device and to the traffic signal disconnect hanger, and a linking device connecting the upper connection device to the lower connection device. The linking device permits movement the upper connection device relative to the lower connection device. The reinforcement device may also include a stiffening assembly operably connected to the traffic signal disconnect hanger and to a traffic signal.

In some embodiments, a reinforcement device for a traffic control assembly is provided. The traffic control assembly include a traffic signal disconnect hanger, a traffic signal, an upper span wire and a span wire claim assembly connected to the upper span wire. The upper span wire is positioned above and supports the traffic control disconnect assembly hanger and the traffic signal. The reinforcement device includes a connecting device operably connected to and positioned above the traffic signal disconnect hanger and the traffic signal and below the upper span wire. The connecting device includes an upper connection device operably connectable to the span wire, a lower connection device operably connected to the upper connection device and to the traffic disconnect assembly hanger, and a linking device connecting the upper connection device to the lower connection device. The linking device is a spring device where the spring device permits movement of the upper connection device relative to the lower connection device and the spring device is configured to distribute loading on the traffic signal assembly.

In yet other embodiments, a method for reinforcing a traffic control assembly is provided. The traffic control assembly includes a traffic signal disconnect hanger, a traffic signal and an upper span wire positioned above and supporting the traffic signal disconnect hanger and the traffic signal. The method includes providing a reinforcement device for the traffic control assembly where the reinforcement device includes a connecting device operably connected to and positioned above the traffic signal disconnect hanger and the traffic signal and below the upper span wire. The connecting device includes an upper connection device operably connectable to the span wire, a lower connection device operably connected to the upper connection device and to the traffic disconnect assembly hanger, and a linking device connecting the upper connection device to the lower connection device. The linking device is a spring device where the spring device permits movement of the upper connection device relative to the lower connection device and the spring device is configured to distribute loading on the traffic signal assembly. The method further includes positioning the connecting device above the traffic signal disconnect hanger and below the upper span wire and operably connecting the lower connection device to the traffic signal disconnect and upper connection device to the upper span wire.

In other embodiments, a reinforcement device for holding a traffic control assembly in compression is provided. The traffic control assembly includes a traffic signal disconnect hanger and/or a traffic signal and a first span wire positioned above the traffic control assembly. In some embodiments, the reinforcement device includes an upper support device connected to the first span wire where the upper support device has a length that is greater than a width of the traffic control assembly and the upper support device is configured to spread the load of the traffic signal assembly to the first span wire. The reinforcement device includes a lower support device operably connected to the traffic signal, a first vertical support member, and a second vertical support member where the first and second vertical members are tensioned when the upper support device, the lower support device and the first and second vertical support members are connected together.

In yet other embodiments, a reinforcement device for holding a traffic control assembly in compression is provided. The traffic control assembly includes a traffic signal disconnect hanger and/or a traffic signal, the traffic signal having a front side including signal lights and a back side opposite the front side, a first span wire positioned above the traffic control assembly and a hanger connected to the first span wire and the traffic control assembly. The reinforcement device includes an upper bracket connected to the hanger and a lower support device operably connected to the traffic signal. The reinforcement device further includes a vertical support member operably connected to the upper bracket and the lower support device, the vertical support member extending along at least a portion of the back side of the traffic signal. The vertical support member is tensioned when the upper bracket, the lower support device and the vertical support member are connected together.

In some embodiments, a reinforcement device for holding a traffic control assembly in compression is provided. The traffic control assembly includes a traffic signal disconnect hanger and/or a traffic signal and a first span wire positioned above the traffic control assembly. The reinforcement device includes an upper support device having a length that is greater than a width of the traffic control assembly and the upper support device is operably connected to the traffic control assembly. The reinforcement device further includes a lower support device operably connected to the traffic signal, a first vertical support member and a second vertical support member, each of the first and second vertical support members having a first end portion operably connected to the upper support device and a second end portion operably connected to the lower support device. The first and second vertical members are tensioned when the upper support device, the lower support device and the first and second vertical support members are connected together.

BRIEF DESCRIPTION OF THE DRAWINGS

FIG. 1 is a perspective view of a prior art traffic control assembly;

FIG. 2 is a perspective view of one embodiment of a retrofitted traffic control assembly of the present invention;

FIG. 11 is a top view of the embodiment shown in FIG. 7;

FIG. 12 is a side view of a connecting member configuration used in one embodiment of the present invention;

FIG. 13 is a side view of a connecting member configuration used in another embodiment of the present invention;

FIG. 19 is a perspective view of one embodiment of a connecting assembly of the present invention containing a hinge;

FIG. 20 is a perspective view of one embodiment of a connecting assembly of the present invention containing a flexible strap;

FIG. 21 is a side view of one embodiment of a retrofitted traffic control assembly of the present invention;

FIG. 22 is a front view of the embodiment shown in FIG. 21;

FIG. 26 is a front view of one embodiment of a connecting assembly of the retrofitted traffic control assembly shown in FIG. 23;

FIG. 27 is a front view of one embodiment of a connecting assembly of the present invention including a dual pivot block;

FIG. 28 is a perspective view of an embodiment of dual pivot block of the present invention;

DETAILED DESCRIPTION OF THE PRESENTLY PREFERRED EMBODIMENTS

Figure 3:
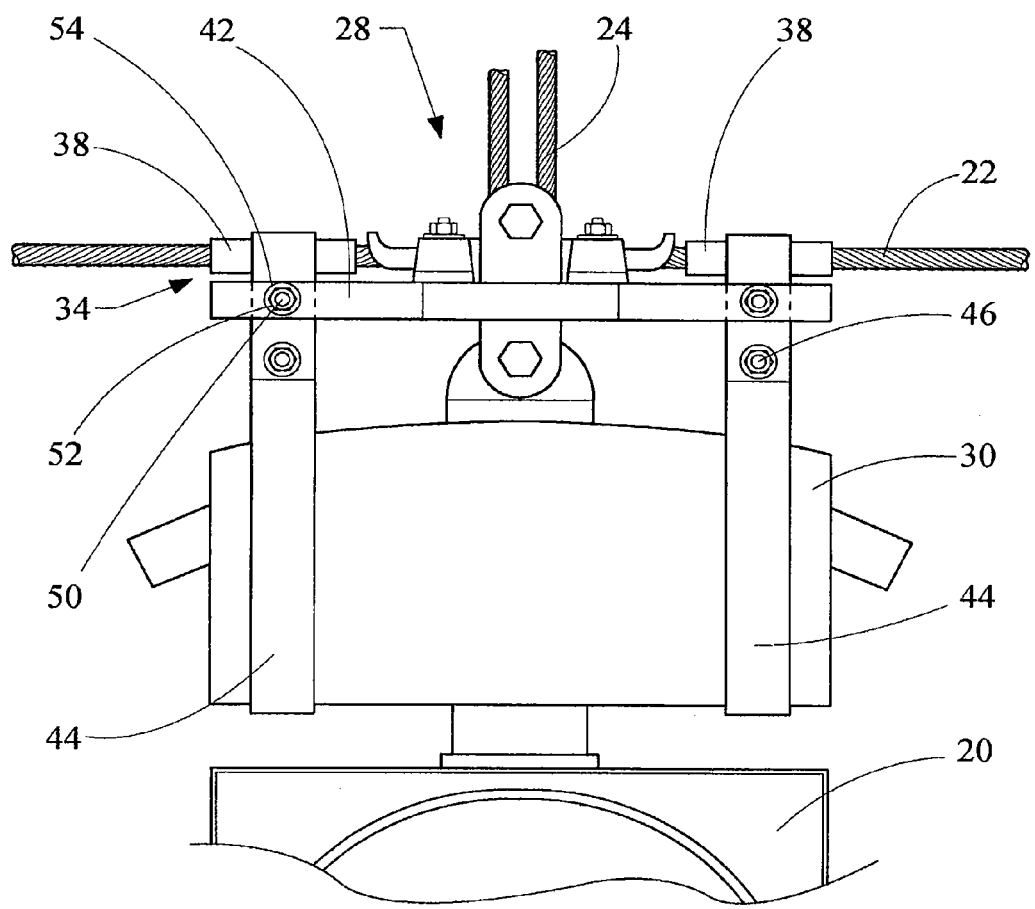
FIG. 3 is a partial front view of a retrofitted traffic control assembly according to one embodiment of the present invention.

Referring now to FIG. 1, a conventional traffic control assembly is shown. As used herein, the phrase "traffic control assembly" refers to any signal, sign, or other device used for affecting vehicular and/or pedestrian traffic, and its related components. As shown in FIG. 1, typical traffic signal assemblies include a traffic signal 20, a plurality of visors 26 positioned on the traffic signal 20, a disconnect hanger 30 positioned above the traffic signal 20, a signal interconnect cable 32 attached to the disconnect hanger 30, a messenger cable/span wire 22 that passes through a signal head hanger and span wire clamp 28, and a tether 24 that leads to a span wire above (not shown). Such an assembly frequently does not withstand high wind forces, resulting in twisting, disorientation, and even detachment of the traffic signal from its supporting structures.

One embodiment of the present invention, as illustrated in FIG. 2, is a retrofitted traffic control assembly in which a clamping assembly 34 is used to secure a traffic signal disconnect hanger 30 to the messenger cable/span wire 22 from which the hanger 30 is suspended, thereby reducing or eliminating points of potential failure and allowing the traffic control assembly to withstand high wind forces. In this embodiment, an existing traffic control assembly, including an existing traffic control device 20, an existing traffic signal disconnect hanger 30, and an existing signal head hanger and span wire clamp 28, is made more stable by using a clamping assembly 34 having two clamping members 44, a front bar member 42, and a rear bar member 40. In this embodiment, the front bar member 42, and rear bar member 40 of the clamping assembly 34 use cambered channels to create positive pressure and facilitate bearing the weight of the traffic control device 20. The clamping assembly 34 of this embodiment of the present invention is illustrated in more detail in FIGS. 3, 4, and 5.

Figure 4:
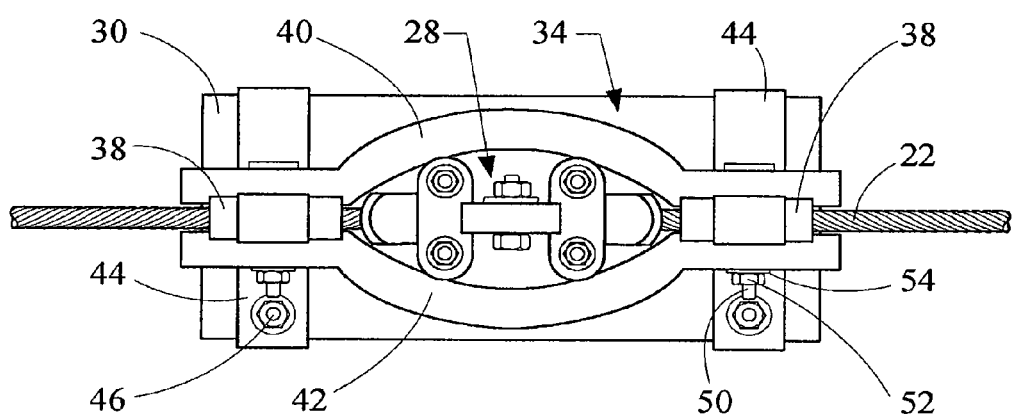
FIG. 4 is a top view of the embodiment shown in FIG. 3.

Referring now to FIGS. 3 and 4, one embodiment of a retrofitted traffic signal disconnect hanger 30 and signal head hanger/span wire clamp assembly 28 is shown. In this embodiment, one clamping member 44 is positioned around each end of the disconnect hanger 30. As shown in FIGS. 3 and 4, a front bar member 42 may be positioned substantially parallel to the span wire 22, substantially perpendicular to the clamping members 44, and adjacent to one side of the signal head hanger/span wire clamp 28; and a rear bar member 40 may be positioned parallel to the span wire 22, substantially perpendicular to the clamping members 44, and adjacent to the opposite side of signal head hanger/span wire clamp 28. In some embodiments, the clamping members 44 include a plurality of elongated apertures for post-clamp tensioning.

In the embodiment shown in FIGS. 3 and 4, the clamping assembly 34 is constructed by connecting the front bar member 42 and the rear bar member 40 to the upper portion of each clamping member 44 that surrounds the traffic signal disconnect hanger 30. This connection may be established in any suitable manner. For example, as shown in FIGS. 3 and 4, the bar members 40, 42 may be connected to the clamping members 44 by a fastening assembly such as a bolt/nut/washer assembly 50, 52, 54, which facilitates alignment of the front bar member 42 with the rear bar member 40. Alternatively, the connection may be established using any of the following, either individually or in any combination: screws, clamps, pins, rivets, retaining rings, studs, buckles, adhesives, anchors, welds, or any other fastening mechanism capable of maintaining a secure connection. A plurality of fastening assemblies, as shown in FIGS. 3 and 4, a single central fastening assembly, or any other suitable fastening configuration may be used. In some embodiments, one or more secondary fastening mechanisms 46 also may be used to assure a secure connection. In other embodiments, the bar members are integral with the clamping members.

Figure 4A:
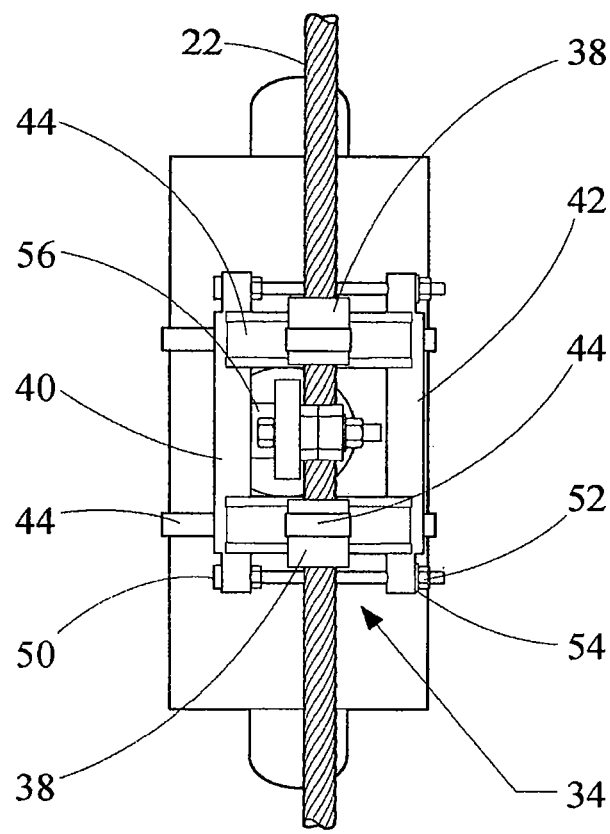
FIG. 4A is a top view of an embodiment of the present invention having linear bar members.

The components of the clamping assembly of the present invention may be of any suitable size and shape for use with a traffic control device and its associated mounting components and support structures. In some embodiments, flexible steel straps are used as clamping members 44, and each bar member 40, 42 includes an arcuate portion with a linear portion at each end of the bar, where the arcuate portion is configured to provide clearance for, and be positioned adjacent to, the signal head hanger/span wire clamp 28, as shown in FIG. 4. Alternatively, the bar members may be straight bars, as shown in FIG. 4A. In this embodiment, the hanger 56 is positioned between the span wire 22 and the rear bar member 40, as shown in FIGS. 4A and 5A, and clears the bar member 40 without the need for an arcuate portion in the bar member. The clamping members 44 and bar members 40, 42 may be of any suitable length, width, and thickness adequate to support the weight of the traffic control device and its associated components.

Figure 5:
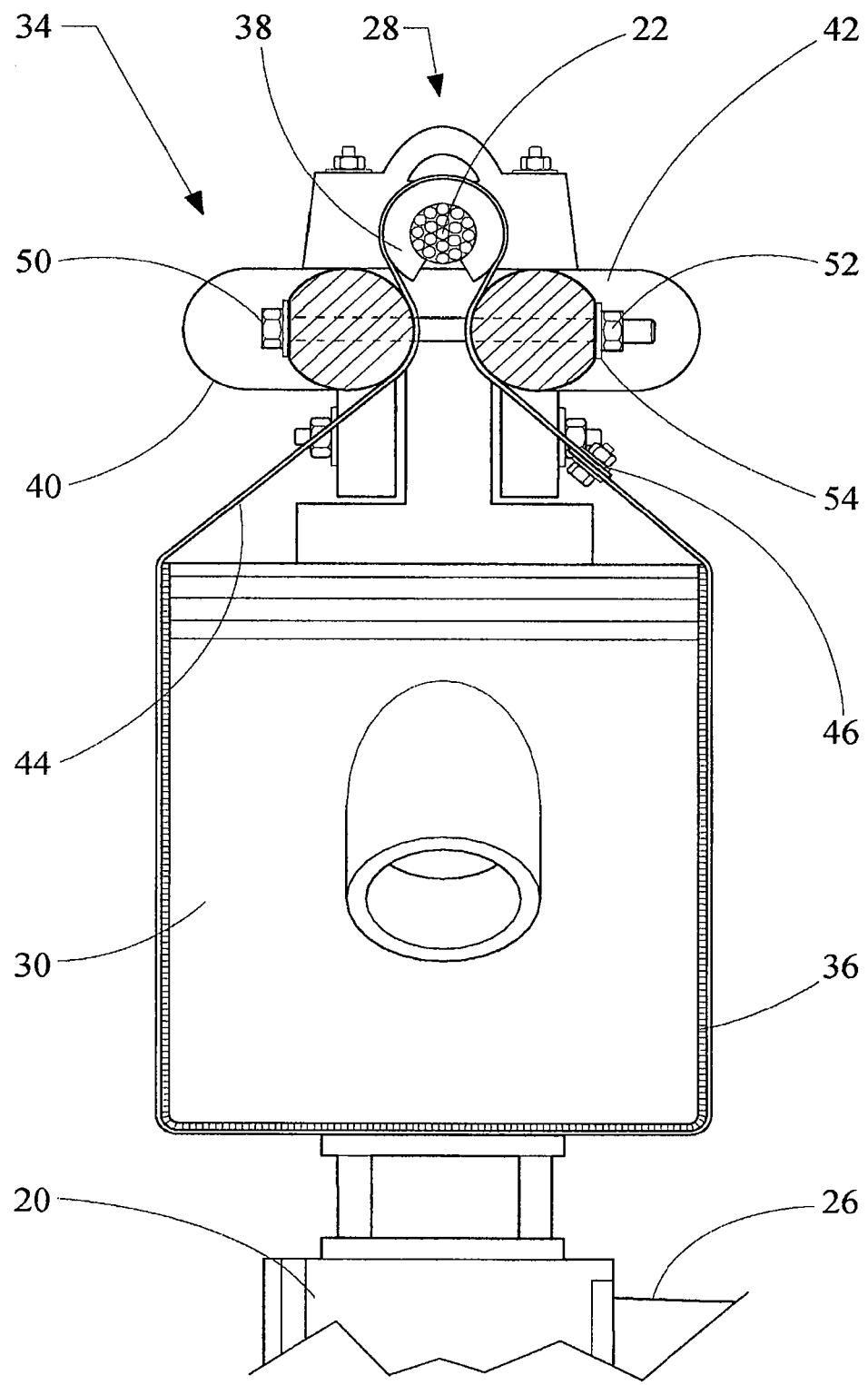
FIG. 5 is an end view of the embodiment shown in FIGS. 3 and 4.
Figure 5A:
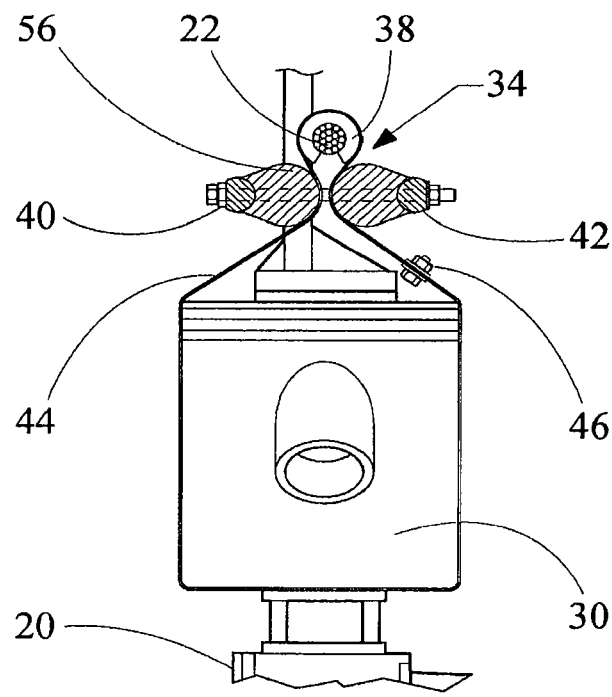
FIG. 5A is an end view of the embodiment shown in FIG. 4A.

As shown in the embodiment of the present invention illustrated in FIG. 5, a liner 36 may be used in conjunction with the clamping members 44. Use of such a liner 36 may facilitate the gripping of the clamping members 44 to the signal disconnect hanger 30 and obtainment of a secure fit. The liner 36 may be made of any suitable material. In certain embodiments, the liner 36 is made of formable material, such as foam.

In some embodiments of the present invention, the clamping assembly 34 includes one or more sleeves 38. Such sleeves 38 may be used, for example, to increase the diameter of an underlying messenger cable and/or span wire 22 and to facilitate the attachment of other components. In the embodiments shown in FIGS. 2, 3, 4, and 5, a sleeve 38 is positioned at least partially around the messenger cable and/or span wire 22 and beneath the clamping members 44 positioned on each side of the traffic signal head hanger/span wire clamp 28. The sleeves 38 may be made of any material suitable for at least partially enfolding the underlying span wire and reducing damage caused by friction, the swaying of the traffic control device, or bearing the weight of the traffic control device, for example. In certain embodiments, the sleeve 38 is made of a malleable material having a hard surface, a foam, a propylene, a polyvinyl chloride, or any other suitable material or combination of materials.

The clamping assembly of the present invention, or any of the components thereof, may be made of any suitable material(s). All of the components of the assembly may be made from the same material, or any component may be made from a material that is different from the material(s) of the other components. Materials such as steel, copper, aluminum, zinc, titanium, metal alloys, composites, polymers, or any other suitable material or combination of materials may be used. In some embodiments, corrosion-resistant metals, such as stainless steel, bronze, or brass, are used. The material(s) used in the present invention may be treated, coated, or plated to enhance the corrosion resistance, appearance, or other properties of the material. Materials such as composite strapping, polyester yarns, polyester woven lashings, nylon plastics, fiber-reinforced cords, and ties such as "zip-ties" or "smart ties" manufactured from polyamides (nylon 6.6, nylon 11, nylon 11 glass-filled), acetyl, stainless steel coated with nylon, or any other engineered thermoplastics may be used.

Figure 6:
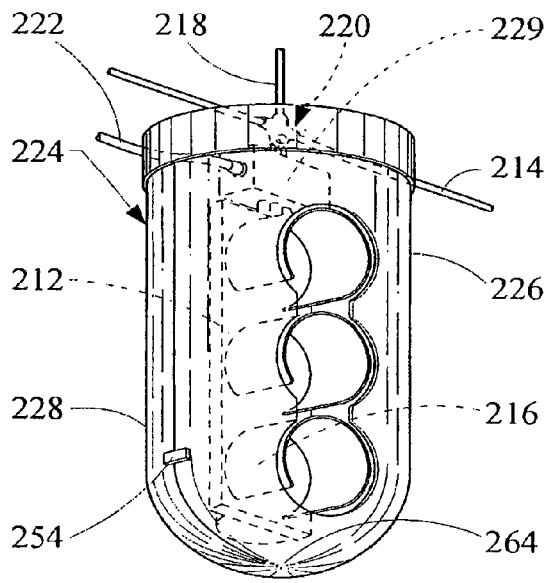
FIG. 6 is a perspective view of another embodiment of a retrofitted traffic control assembly of the present invention.
Figure 8:
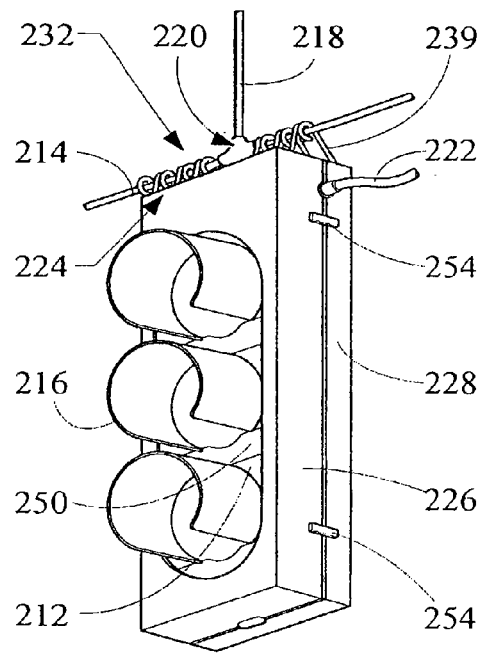
FIG. 8 is a perspective view of still another embodiment of a retrofitted traffic control assembly of the present invention.
Figure 7:
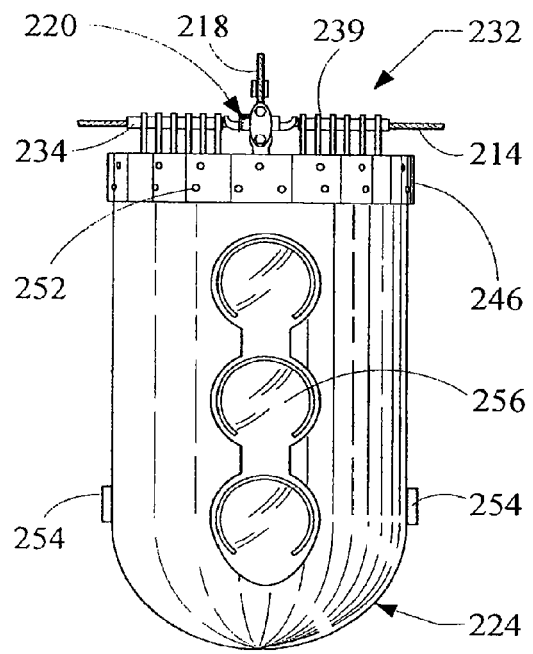
FIG. 7 is a front view of another embodiment of a retrofitted traffic control assembly of the present invention.
Figures 9, 10:
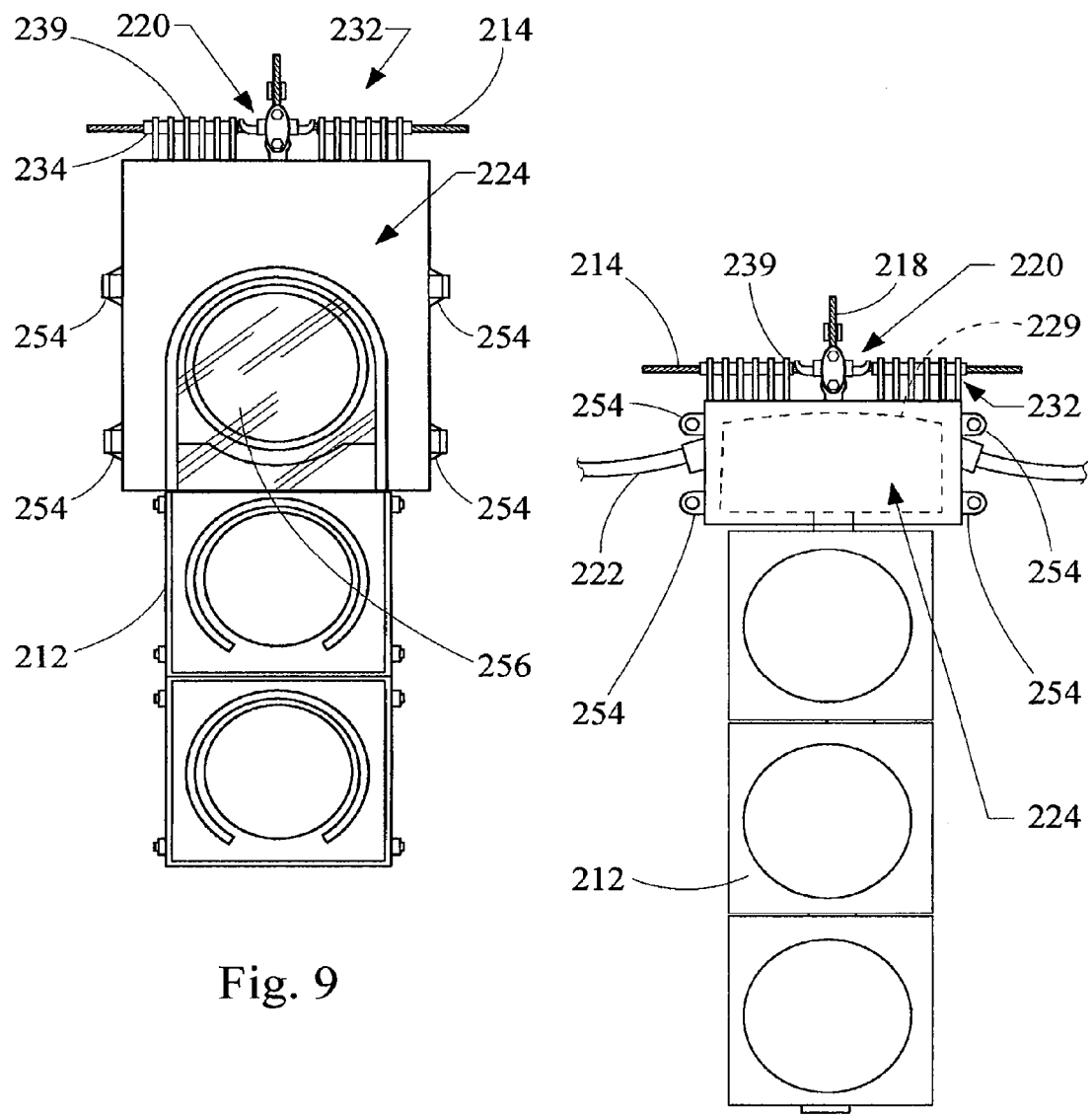
FIG. 9 is a front view of still another embodiment of a retrofitted traffic control assembly of the present invention.
FIG. 10 is a front view of yet another embodiment of a retrofitted traffic control assembly of the present invention.

In some embodiments of the present invention, a traffic control assembly is retrofitted by enclosing an existing traffic signal assembly, or portions thereof, with an encasement, and by reinforcing the connection between the enclosure and the span wire. Exemplary embodiments are shown in FIGS. 6 through 10. In these embodiments, an enclosure 224 is positioned around at least a portion of an existing traffic signal 212 and/or traffic signal disconnect hanger 229. In the embodiment of FIGS. 6 and 7, the enclosure encompasses the entire traffic signal 212, the traffic signal visors 216, and the traffic signal disconnect hanger 229. In the embodiment of FIG. 8, the enclosure 224 encompasses the traffic signal 212 and the traffic signal disconnect hanger 229. In the embodiment of FIG. 9, the enclosure 224 encompasses the traffic signal disconnect hanger 229 and only a portion of the traffic signal 212. In the embodiment of FIG. 10, the enclosure 224 encompasses only the traffic signal disconnect hanger 229. Variations of these embodiments, as well as any other suitable configuration, also may be used.

The enclosure 224 may have any suitable shape and size. For example, the shape of the enclosure 224 may be generally cylindrical, rectangular, square, oval, polygonal, or any other suitable shape. The enclosure 224 may be symmetrical or asymmetrical, and may be configured to conform to traffic control assemblies of any shape and size.

The enclosure 224 may be an integral unit or a construction made of multiple elements. For example, the enclosure 224 may be made of a front portion 226 and a rear portion 228, connected by one or more fastening devices 254, such as hinges, bolts, screws, rivets, clamps, latches, pins, buckles, adhesives, welds, or any other suitable fastener, to maintain the front portion 226 and the rear portion 228 of the enclosure 224 in a closed position. In some embodiments, the connection between the front portion 226 and the rear portion 228 of the enclosure 224 comprises a mortise and tenon assembly that creates a stiffening member and facilitates self-alignment of the two portions. The installation of an enclosure over an existing traffic control device may be facilitated by the use of a pivotal connection between two halves of the enclosure (on the side, top, and/or bottom of the enclosure) so that one portion may be secured, and then the second portion may be pivoted into position to mate with the first portion. One or more supplemental fastening devices also may be used to maintain a secure connection.

In the embodiments of FIGS. 6 and 7, the enclosure 224 includes an attachment cap having a front portion 246 and a rear portion 244 connected by one or more fastening mechanisms 252. The attachment cap may have any suitable construction, including a unitary construction or a construction containing multiple components, where the components are configured to mate with each other. The attachment cap may have a central aperture 243, as shown in FIG. 11, to facilitate access to the traffic signal head hanger 220. In some embodiments, the fastening mechanism 252 includes a plurality of rivets spaced about the periphery of the front portion 246 and the rear portion 244 of the attachment cap.

The enclosure 224 may be configured to allow for the passage of traffic signal interconnect cables 222 or other traffic control components as necessary. The enclosure 224 also may include an aperture 264 to permit drainage from the enclosure 224. The aperture 264 may be positioned at any suitable location. For example, in the embodiment of FIG. 6, the aperture 264 is positioned near the bottom of the enclosure 224.

In certain embodiments of the present invention, a mechanism may be used to strengthen the connection between an enclosure or other suspended traffic control assembly, and a support structure such as a span wire. In some embodiments, the connection assembly 232 includes a plurality of connecting members 239 configured to be used in conjunction with a rod 234 and span wire 214, as shown in FIGS. 12 and 13, for example. The connecting members 239 and rod 234 may be separate components or an integral unit (e.g., by cast or weld). The connection assembly 232 may be used to maintain the alignment of the front portion 246 and the rear portion 244 of the attachment cap, as shown in FIG. 11. The connecting members 239 may be attached to one or more attachment plates 237, as shown in FIGS. 12 and 13, by cast, weld, bolts, screws, buckles, latches, clamps, pins, rivets, adhesives, or any other suitable fastening mechanism. The attachment plates 237 may be attached to the enclosure 224 by any suitable fastening mechanism 252, including but not limited to those described above. A sleeve 236 may be positioned around the span wire 214, and the connecting members 239 may be wrapped around the span wire 214 and sleeve 236, and around the rod 234, as shown in FIG. 12 or 13, or in any other manner sufficient to establish a secure connection. The sleeve 236 may be used to increase the circumference of an underlying span wire 214, thereby facilitating the attachment of other components to the span wire 214. The sleeve 236 may be made of any material suitable for at least partially enfolding the underlying span wire 214 and resisting or preventing damage thereto that may otherwise be caused by various external forces.

In certain embodiments, the enclosure 224 is positioned beneath a lower span wire 214 and a traffic signal head hanger 220 through which the lower span wire 214 and a tether 218 to an upper span wire pass. Any suitable material, such as a high strength, impact resistant metal (e.g., stainless steel), polycarbonate, or thermoplastic, may be used for the enclosure 224 and other components of the traffic control assembly. The material may be treated with an ultraviolet resisting chemical, if desired. The enclosure 224 may comprise a clear thermoplastic material 256 so that the traffic lights may be visible through the enclosure. In some embodiments, only the portions of the enclosure near the traffic lights are made of a clear material, and the remaining portions comprise another color and/or material.

A protective liner may be positioned adjacent the enclosure 224. In some embodiments, placed within the enclosure 224 is a protective liner or other structure made of an impact-absorbing composite material, such as a thermoplastic honeycomb material (e.g., a lightweight alveoli structure embedded in a foam material), or any other material suitable for transferring horizontal and transverse loads away from the traffic control device and toward the rear portion of the enclosure. In certain embodiments, one or more metal cross members 250 are embedded within the impact-absorbing material, as shown in FIG. 8. In some embodiments, the installation of materials or structure within the enclosure is facilitated by the use of various openings or clearance spaces within the material or structure.

Figure 14:
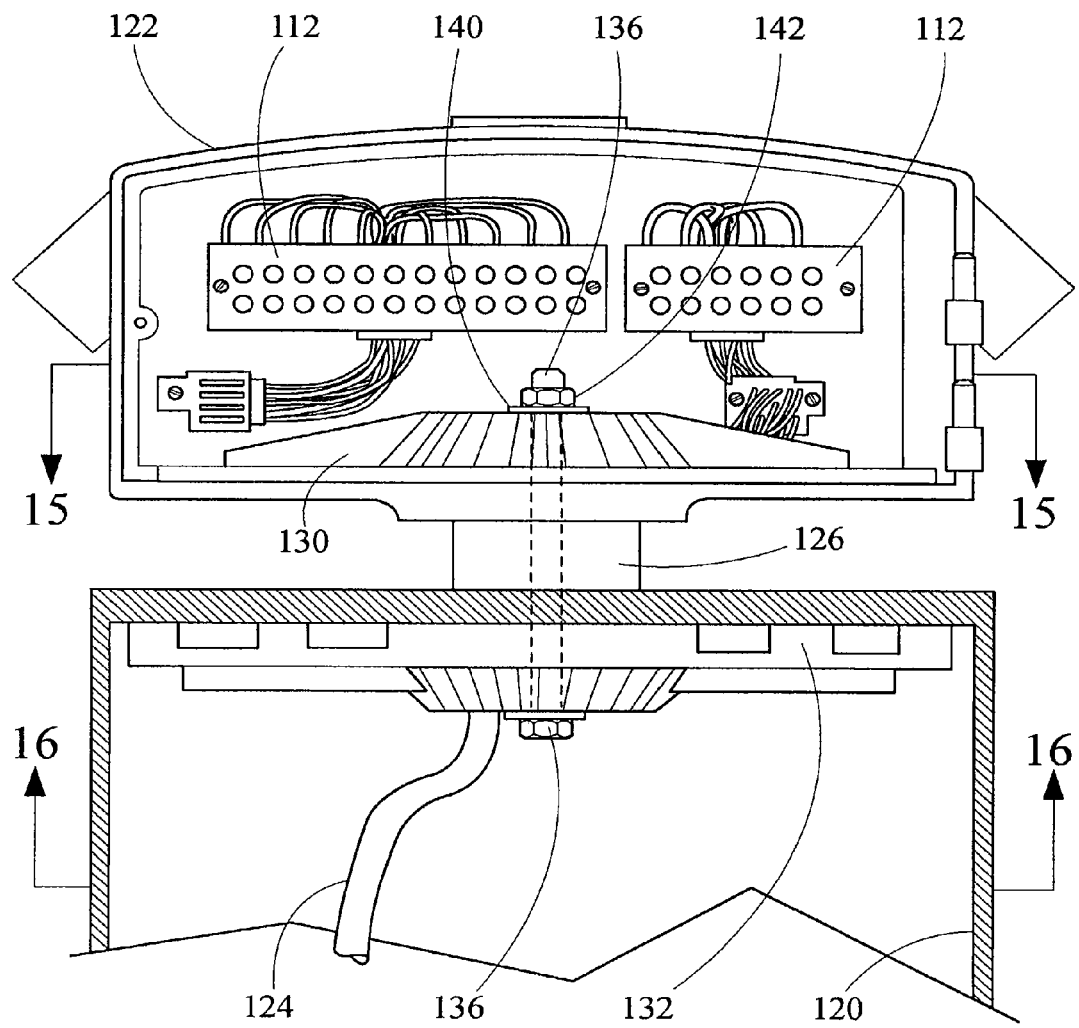
FIG. 14 is one embodiment of a retrofitted traffic signal and traffic signal disconnect hanger containing a stiffening assembly.

According to some embodiments of the present invention, the wind resistance of a traffic control assembly is increased by retrofitting an existing traffic control assembly with a reinforcement device. For example, stiffening plates may be used to strengthen the connection between a traffic signal and a traffic signal disconnect hanger of a traffic control assembly. One embodiment of such a stiffening member reinforcement device is shown in FIG. 14. In this embodiment, the reinforcement device includes an upper stiffening member 130 and a lower stiffening member 132. The stiffening members 130, 132 may be made of any material suitable for reducing the stresses between a traffic signal and a traffic signal disconnect hanger, such as cast aluminum or drop forged metal. The upper stiffening member 130 may be attached to, or incorporated into, an existing traffic signal disconnect hanger 122. For example, the upper stiffening member 130 may be positioned within a traffic signal disconnect hanger 122, beneath the electrical connection lugs 112, and may be adapted to be connected using existing bolt holes provided to attach existing hold down bars. Similarly, the lower stiffening member 132 may be attached to, or incorporated into, an existing traffic signal 120, as shown in FIG. 14. Alternatively, the stiffening members 130, 132 may be positioned in any other location within a traffic control assembly to reduce the stresses between various portions of the assembly that may otherwise weaken, attenuate, or break upon exposure to forces such as heavy wind conditions. Other components, such as reinforcement plates or spacers, for example, may also be incorporated into the reinforcement device of the present invention.

In some embodiments of the present invention, the stiffening members 130, 132 are connected by a fastening assembly that includes an elongated bolt 136, nut 142, and washer 140, such as a lock washer. However, any suitable fastening mechanism or assembly may be used. In the embodiment of FIG. 14, an elongated bolt 136 connects an upper stiffening plate 130 associated with a traffic signal disconnect hanger 122 to a lower stiffening plate 132 associated with a traffic signal head 120 by extending through an aperture in the upper stiffening plate 130, through a hub 126 associated with the disconnect hanger 122, and through an aperture in the lower stiffening plate 132. In this embodiment, a nut 142 and washer 140 are used to compress the assembly and obtain a moisture-resistant connection that maintains a predetermined degree of tension over time and withstands high wind forces.

Figure 15:
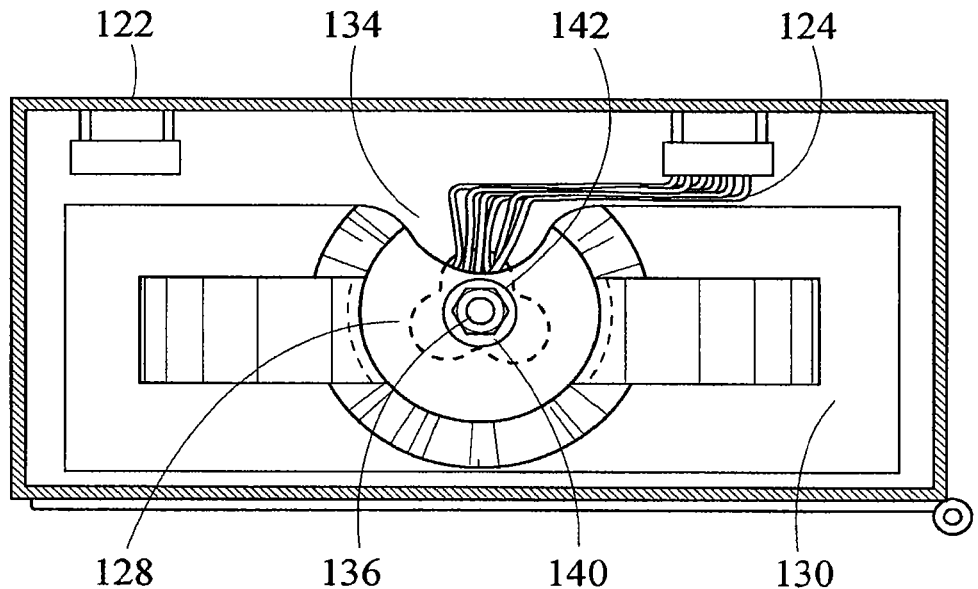
FIG. 15 is a top view of one embodiment of an upper stiffening plate of the present invention, as taken along line 15-15 of FIG. 14.

FIG. 15 shows a top view of the upper stiffening plate of the embodiment of FIG. 14, as taken along line 15-15. In this embodiment, the upper stiffening plate 130 is positioned within a traffic signal disconnect hanger 122. However, in other embodiments, the upper stiffening plate 130 may be positioned on, in, or adjacent to any other component or components of a traffic control assembly. In the embodiment of FIG. 15, the upper stiffening plate 130 has a generally rectangular shape, but the stiffening members used in the present invention may be of any suitable size and shape. For example, the stiffening members may be plates having a shape that is generally rectangular, round, oval, square, polygonal, curvilinear, hemispherical, or any other shape conducive to attachment to, or incorporation into, a component of a traffic control assembly. The stiffening members may be symmetrical or asymmetrical. In some embodiments, such as the embodiment of FIG. 15, the upper stiffening plate 130 may contain an aperture 134 to allow clearance for a wiring harness 124 or any other component of a traffic control assembly.

Figure 16:
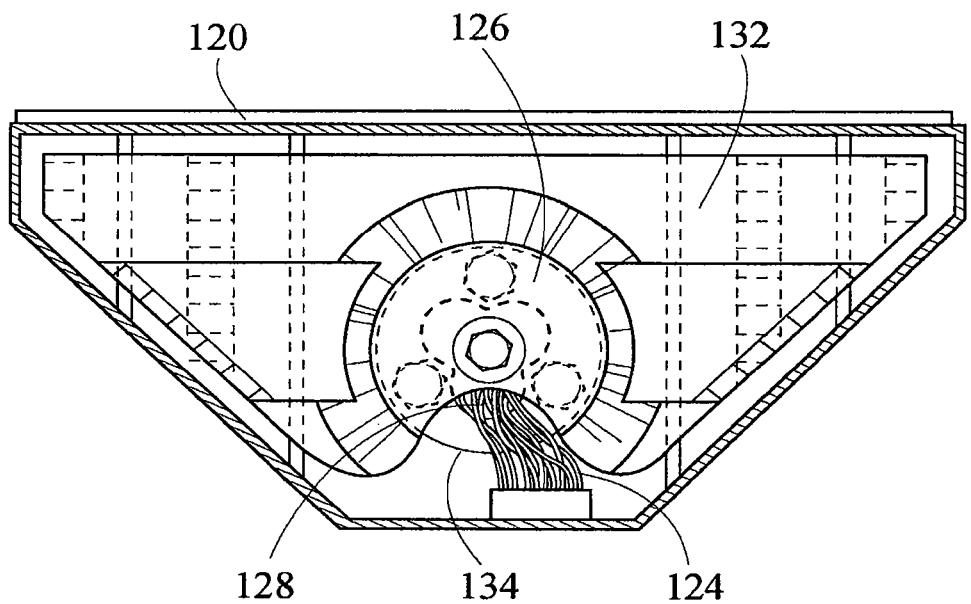
FIG. 16 is a bottom view of one embodiment of a lower stiffening plate of the present invention, as taken along line 16-16 of FIG. 14.

FIG. 16 shows a bottom view of the lower stiffening plate of the embodiment of FIG. 14, as taken along line 16-16. In this embodiment, the lower stiffening plate 132 is positioned within a traffic signal 120. However, in other embodiments, the lower stiffening plate 132 may be positioned on, in, or adjacent to any other component or components of a traffic control assembly. In the embodiment of FIG. 16, the lower stiffening plate 132 has a generally triangular shape, but any suitable shape may be used. In some embodiments, such as the embodiment of FIG. 16, an aperture 128 is provided in the hub 126 to allow clearance for a wiring harness 124, or clearance for any other component of a traffic control assembly.

Figure 17:
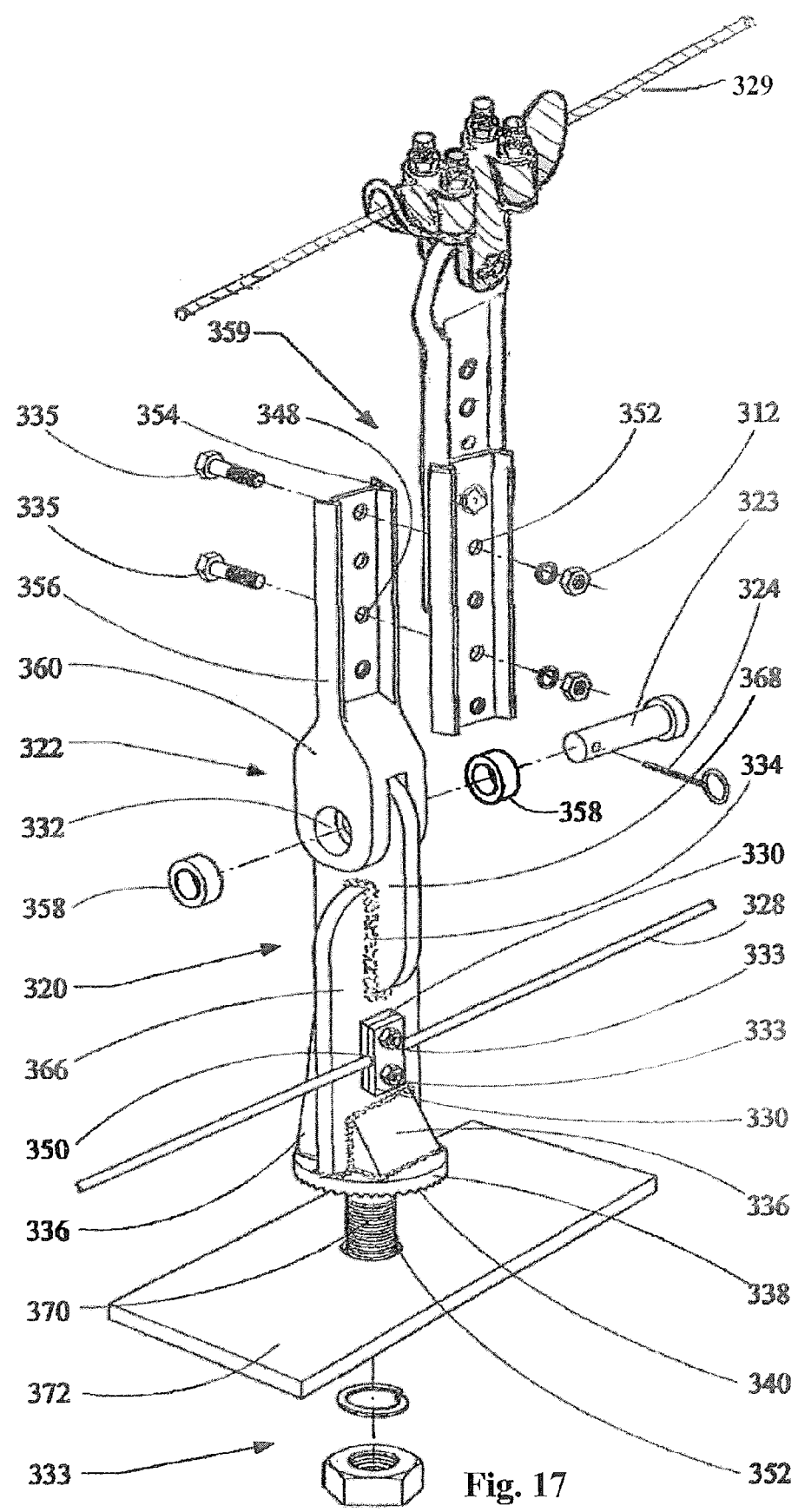
FIG. 17 is a perspective view of one embodiment of a connecting assembly of the present invention containing a pivot pin and a single stud connecting mechanism.

According to some embodiments of the present invention, the wind resistance of a traffic control assembly is increased by reinforcing or otherwise modifying the components of the traffic control assembly located between an upper span wire and a traffic signal head hanger or disconnect device. For example, the traffic control assembly may be modified by including a pivot point within the portion of the traffic control assembly located between the upper span wire and the lower span wire to reduce the flexural stresses that affect that portion during high wind storm events. One such embodiment is shown in FIG. 17. In this embodiment, the portion of the traffic control assembly located above the lower span wire 328 and below the upper span wire (not shown) includes a pivot pin 323 having an axis parallel to the axis of the span wire 328. The pivot pin 323 connects an upper connection device 322 to a lower connection device 320. The pivot pin 323 may be inserted into an aperture 332 and bushing 358, and may be held in place by a cotter pin 324 configured for insertion into an aperture in the pivot pin 323.

In the embodiment of FIG. 17, the upper connection device 322 includes a clevis portion 360 and an extension portion 356. The extension portion may contain a plurality of extension apertures 348 and "V"-shaped mating grooves 354 configured to mate with the "V"-shaped mating extrusions 355 of an existing hanger device 359 having a plurality of attachment apertures 352. In the embodiment of FIG. 17, the outer pointed portions of the "V"-shaped mating grooves 354 of the upper connection device 322 nest within the inner portions of the "V"-shaped mating extrusions of the hanger device 359. In other embodiments, such as the embodiment shown in FIG. 18, the inner portions of the "V"-shaped mating grooves 354 of the upper connection device 322 nest with the outer pointed portions of the "V"-shaped mating extrusions of the hanger device 359. Any suitable fastening mechanism, such as a combination of bolts 335, nuts 312, and lock washers, for example, may be used to secure the hanger device 359 to the extension portion 356 of the upper connection device 322 and to adjust the hanger device 359 in a desired position relative to the extension portion 356 of the upper connection device 322.

Figure 18:
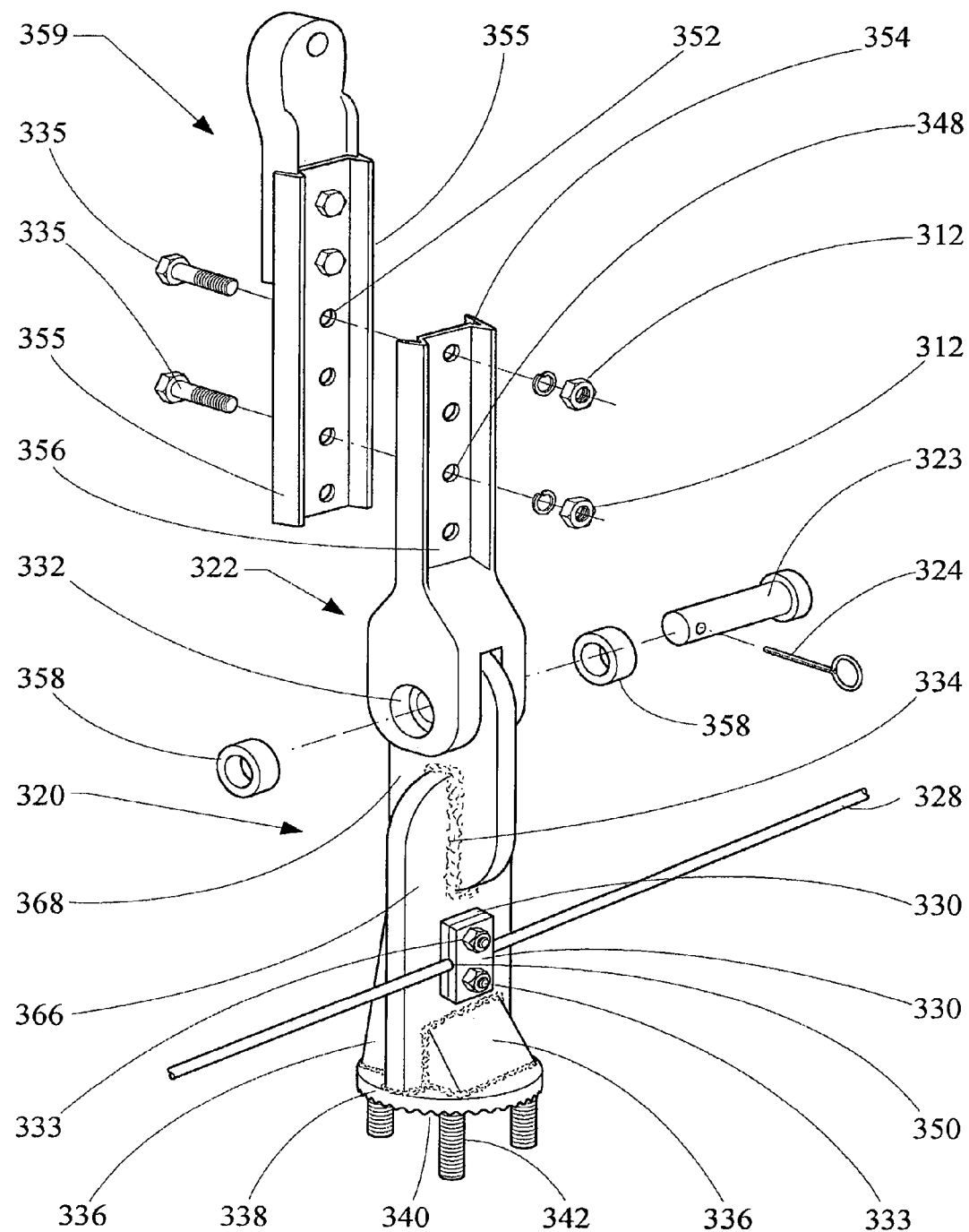
FIG. 18 is a perspective view of another embodiment of a connecting assembly of the present invention containing a pivot pin and a tri-stud connecting mechanism.

In the embodiment of FIG. 17, the lower connection device 320 includes a lower portion 366 and an upper portion 368, where the lower portion 366 is positioned substantially perpendicular to the upper portion 368. In this embodiment, the lower connection device 320 may include an integral fillet 334 and one or more support members 336 positioned adjacent the lower portion 366. The support members and fillet may be of any suitable shape and may be positioned in any location sufficient to serve their intended functions. This embodiment also includes a hub plate 338, which may be of any suitable shape and may be configured to receive an integral serrated boss 340, for the rotational alignment of an existing disconnect hanger to the lower connection device 320. A single stud 370 may be positioned beneath the hub plate 338 and may be configured to be inserted into an aperture 352 within an underlying support plate 372, as shown in FIG. 17, and may be used as a means of attachment to an existing traffic signal disconnect hanger. Alternatively, a tri-stud bolt connection 342, as shown in FIGS. 18 through 20, may be used. The single stud 370 or tri-stud 342 connections, and the support plate 372, may be secured to a support structure, such as a disconnect hanger, with any suitable fastening mechanism, such as an appropriate combination of nuts, bolts, and/or washers 333. The support plate 372 may be used to facilitate spreading the load placed on a traffic control assembly, in place of, or in addition to other devices, such as load spreading washers. The lower connection device 320 may be secured to a span wire 328 through a groove 350 located in one or more tether blocks 330, as shown in FIGS. 17 and 18.

In some embodiments of the present invention, the upper connection device 322 is connected to the lower connection device 320 in a manner that permits a traffic signal to deflect from its resting longitudinal axis by about 5 to about 25 degrees during 35 mile per hour winds; in other embodiments, by about 10 to about 20 degrees during 35 mile per hour winds; and in still other embodiments, by about 16 degrees during 35 mile per hour winds. In certain embodiments, the upper connection device 322 is connected to the lower connection device 320 in a manner that permits a traffic signal to deflect from its resting longitudinal axis by about 50 to about 100 degrees during 140 mile per hour winds; in other embodiments, by about 60 to about 90 degrees during 140 mile per hour winds; and in still other embodiments, by about 74 degrees during 140 mile per hour winds.

In one embodiment of the present invention, the portion of a traffic control assembly located between two span wires is modified by the addition of a hinged hanger strap 362, as shown in FIG. 19, or a flexible hanger strap 364, as shown in FIG. 20. In such embodiments, the hanger strap 362, 364, which may contain a plurality of apertures 374 therein, may be positioned between a lower connection device 320 and an upper hanger 359. The apertures 374 on the upper portion of the hanger strap 362, 364 may be aligned with apertures 352 in the upper hanger 359, and the desired position maintained by placing one or more bolts 335, or any other suitable fastening mechanism, through the apertures 352, 374 and securing it with washers and/or nuts, for example. Similarly, the apertures 374 on the lower portion of the hanger strap 362, 364 may be aligned with apertures 314 in the lower connection device 320 to secure a desired position.

According to some embodiments of the present invention, the wind resistance of a traffic control assembly is increased by reinforcing or otherwise modifying the components of the traffic control assembly located between an upper span wire and a lower span wire or a disconnect device. For example, the traffic control assembly may be modified to include one or more pivot points within the portion of the traffic control assembly located between the upper span wire and the disconnect device to reduce the flexural stresses that affect that portion during high wind storm events. The pivot connection performs as a damper that reduces the stresses that occur from wind induced oscillations transverse to the wind direction and helps to strengthen known area failures from wind-induced shock loads. As shown in FIGS. 21 and 22, an embodiment of a retrofitted traffic control assembly 410 includes a connecting assembly 412 having an upper connection device 434 and a lower connection device 438, where the upper connection device 434 is operably connected to an existing hanger 426 of a traffic control assembly 400. The upper connection device 434 may be connected to the hanger 426 by any method known in the art, for example using fasteners including bolts, washers and nuts 452. The retrofitted traffic control assembly 410 may also include a linking device 436 operably connecting the upper connection device 434 and the lower connection device 438 and allowing the upper and lower connection devices 434, 438 to move relative to each other.

In some embodiments, the linking device 436 may include two pivotable connections, a first pivotable connection 481 and a second pivotable connection 483 as shown in FIG. 26. One exemplary embodiment of a portion of the linking device 436 is shown in FIG. 28 illustrating a dual pivot block 437 having apertures 464 therethrough for receiving pivot pins 450 that may be held in position by cotter pins 451 (shown in FIGS. 21 and 22). The dual pivot block 437 provides additional strength to the retrofitted traffic control assembly 410. By way of non-limiting example, the dual pivot block 437 may be formed from stainless steel and may be provided as a solid block to provide additional strength compared to cast aluminum. The dual pivot block 437 allows the pivot pins 450 to be positioned close together to reduce the stresses to the upper and lower connection devices 434, 438 and to reduce the range of movement. In some embodiments the pivot pins 450 may be spaced apart by about 1 inch (25.4 mm) or less and in some embodiments about ½ inch (12.7 mm) or less. The range of movement may be about 1 inch (25.4 mm). Compared to known traffic signals, positioning the pivot pins 450 close together may reduce the detrimental range of motion by about 75% thus advantageously creating less loading on the retrofitted traffic signal assembly 410. Other embodiments of the linking device 436 may include clevis adaptors, similar to the clevis described above, or a double clevis adaptor having two axes for pivotal movement. In some embodiments having two pivotable connections, one of the pivot pins 450 extends along an axis parallel to an axis of the lower span wire 420a and the other pivot pin 450 extends along an axis perpendicular to the axis of the lower span wire 420a. Other types of linking devices similar to the embodiments described above may also be used with the assembly 410. The lower connection device 438 may be connected to a lower span wire 420a of the traffic control assembly 400 such as by an existing clamp 428. As shown in FIGS. 21 and 22, the linking device 436 may be positioned above the lower span wire 420a. In some embodiments, discussed in more detail below, the linking device 436 may be positioned below the lower span wire 420a of the traffic control assembly 400.

The retrofitted traffic control assembly 410 may also include a support plate 440 operably connected to the lower connection device 438 and an existing traffic signal disconnect hanger 430 of the traffic control assembly 400. The support plate 440 may be positioned against an upper wall 431 of the disconnect hanger 430, within the disconnect hanger 430 or external thereto for strengthening the retrofitted traffic control assembly 410. A nut 454 may be used to connect the support plate 440 to the lower connection device 438, although any connector known to one skilled in the art may be used.

Figure 24:
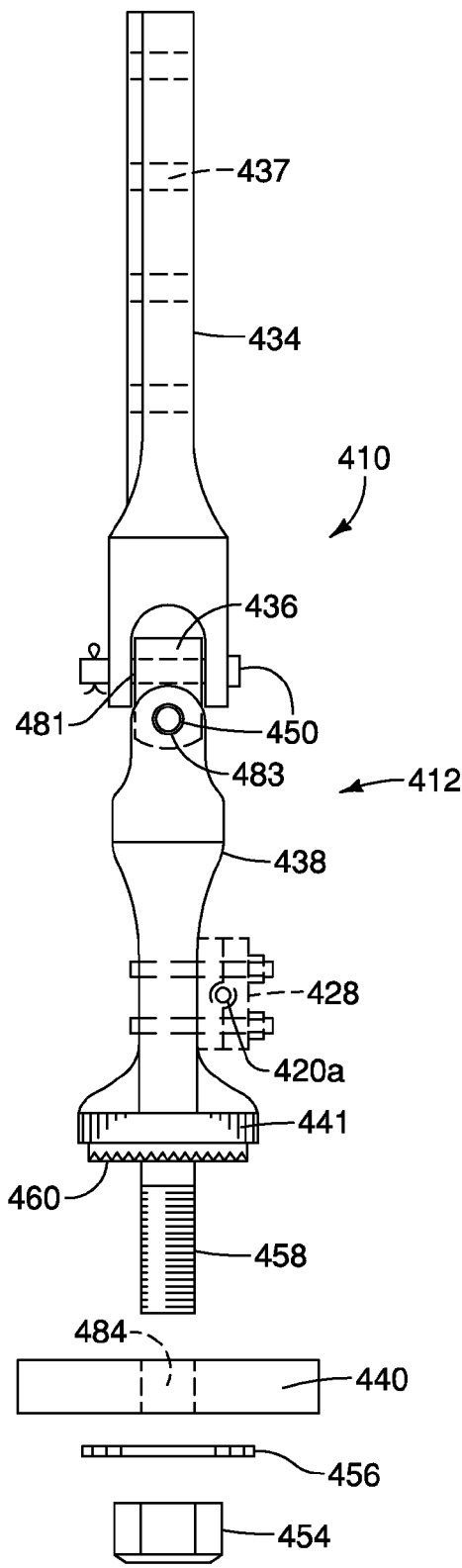
FIG. 24 is a side view of one embodiment of a connecting assembly of the retrofitted traffic control assembly shown in FIG. 21.
Figure 25:
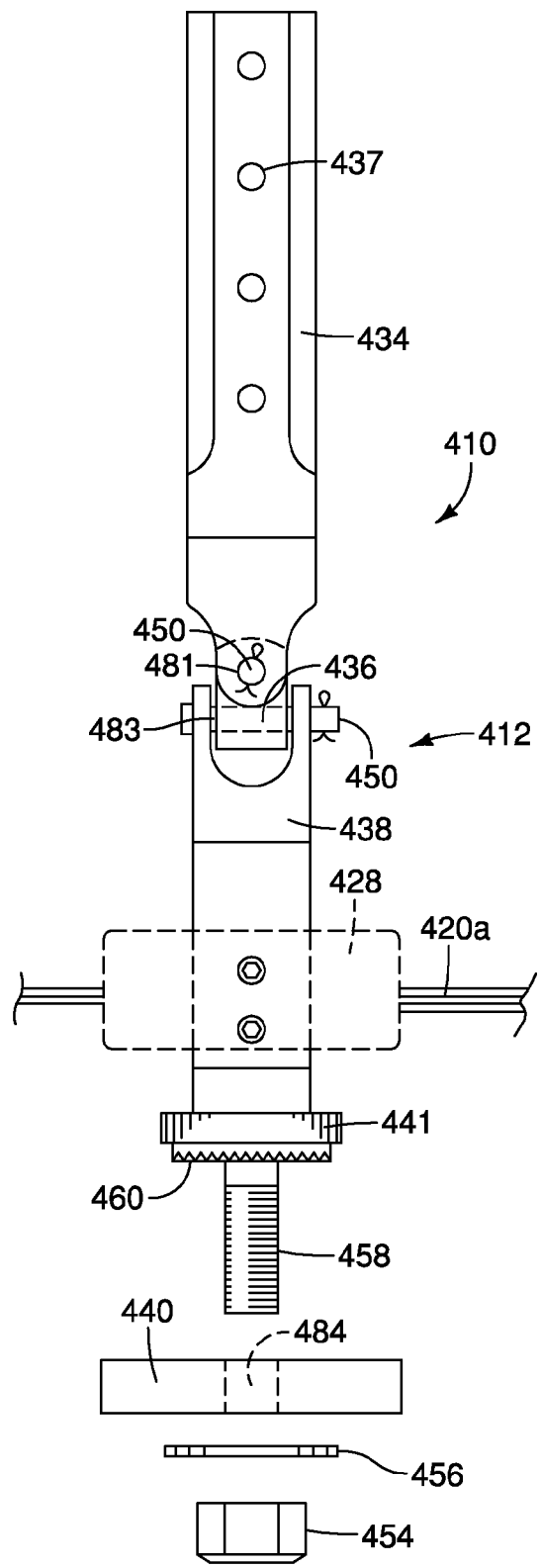
FIG. 25 is a front view of the embodiment shown in FIG. 24.

The connecting assembly 412 of the retrofit traffic control assembly 410 illustrated in FIGS. 21 and 22 is shown in more detail in FIGS. 24 and 25. The upper connection device 434 may include one or more apertures 437 that allow the length of the traffic control assembly 400 to be adjustable when the upper connection device 434 is connected to the hanger 426. The apertures 437 may be aligned with apertures on the hanger 426 to adjust the length of the entire assembly and to securely connect the upper connection device 434 and the hanger 426 using one or more fasteners 452 inserted through the aligned apertures. In some embodiments, the retrofit traffic control assembly 410 may be incorporated into an existing traffic control assembly 400 and the height of the system may be configured to be within one inch of the original position of the traffic control assembly 400 using the apertures and the fasteners to adjust the length.

Figure 29:
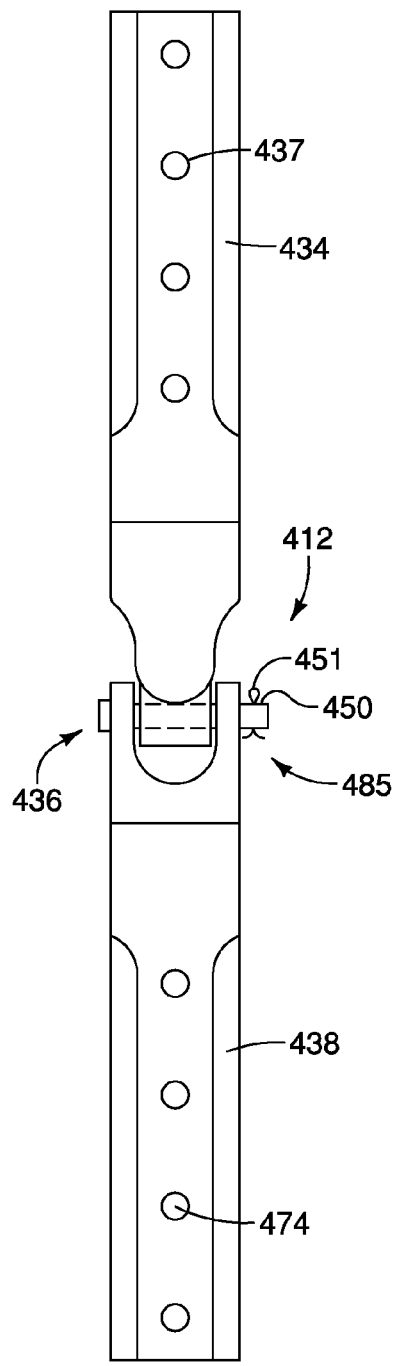
FIG. 29 is a front view of one embodiment of a connecting assembly of the present invention.

FIG. 27 illustrates the upper connection device 434 and the lower connection device 438 each includes apertures 437, 474, respectively, for adjustment of the length of the entire traffic control assembly 400 and for multiple connections. The first pivotable connection 481 and second pivotable connection 483 are also shown positioned adjacent to each other and between the upper connection device 434 and the lower connection device 438. In some embodiments, the area between the upper span wire 420b and the lower span wire 420a may be modified by adding the upper and lower connection devices 434, 438 having the linking device 436 having the first connection 481 and the second connection 483 between the upper and lower span wires 420b, 420a with the connecting assembly 412 shown in FIG. 27 to an existing upper hanger device 359 and a lower device 336 (see FIGS. 19 and 20). The apertures 437 in the upper connection device 434 may be aligned with apertures 352 on the existing upper hanger device 359 and connected thereto with one or more bolts 335 secured with washers and/or nuts or any other suitable fastening mechanism. The apertures 474 in the lower connection device 438 may be aligned with apertures 314 in the lower device 336 and connected thereto with one or more bolts 335 secured with washers and/or nuts or any other suitable fastening mechanism. FIG. 29 illustrates the connecting assembly 412 having the linking device 436 including a first connection 485 that may be similarly connected between the upper and lower span wires 420b, 420a as described for FIG. 27.

The lower connection device 438 may include a hub plate 441 that may be configured to receive an integral serrated boss 460 for the rotational alignment of the existing disconnect hanger 426 to the lower connection device 438. The lower connection device may also include one or more studs 458. The support plate 440 includes an aperture 484 through which the stud 458 inserts. A nut 454 and a washer 456 may be used to secure the support plate 440 to the traffic signal disconnect hanger (shown in FIG. 21) and onto the stud 458 of the lower connection device 438.

As shown in FIGS. 21 and 22, the retrofitted traffic control assembly 410 may also include a first stiffening member 442 and a second stiffening member 444 connected by a fastener 452 extending through the first stiffening member 442 and the second stiffening member 444 for strengthening the retrofitted traffic control assembly 410 similar to the arrangement described in the embodiments above. The first stiffening member 442 may be operably connected to a lower wall 433 of the disconnect hanger 430 and the second stiffening member may be operably connected to an upper wall 435 of an existing traffic signal 432. The first and second stiffening members 442, 444 may be attached to or incorporated into the disconnect hanger 430 and traffic signal 432 respectively, by any method known to one skilled in the art. Similar to the first and second stiffening members discussed above, the first and second stiffening members 442, 444 each include an aperture 446 formed in an edge of the members 442, 444 for accommodating existing wires 448 of the traffic control assembly 400. The apertures 446 allow for the stiffening members 442, 444 to be retrofit into the disconnect hanger 430 and the traffic signal 432, respectively, without disconnecting the wires 448 during the retrofitting process.

As shown in FIGS. 21 and 22, the retrofitted traffic control assembly 410 may be retrofitted into an existing traffic control assembly 400 where the existing traffic control assembly 400 includes an upper span wire 420b and an existing span wire saddle clamp 422 pivotably connected to the existing hanger 426 by an existing pivot connection 424. The upper connection device 434 of the retrofitted traffic control assembly 410 extends below and is connected to the hanger 426. In some embodiments, the upper connection device 434 may replace the hanger 426 and may be connected to the upper span wire 420b using the span wire saddle clamp 422.

Figure 23:
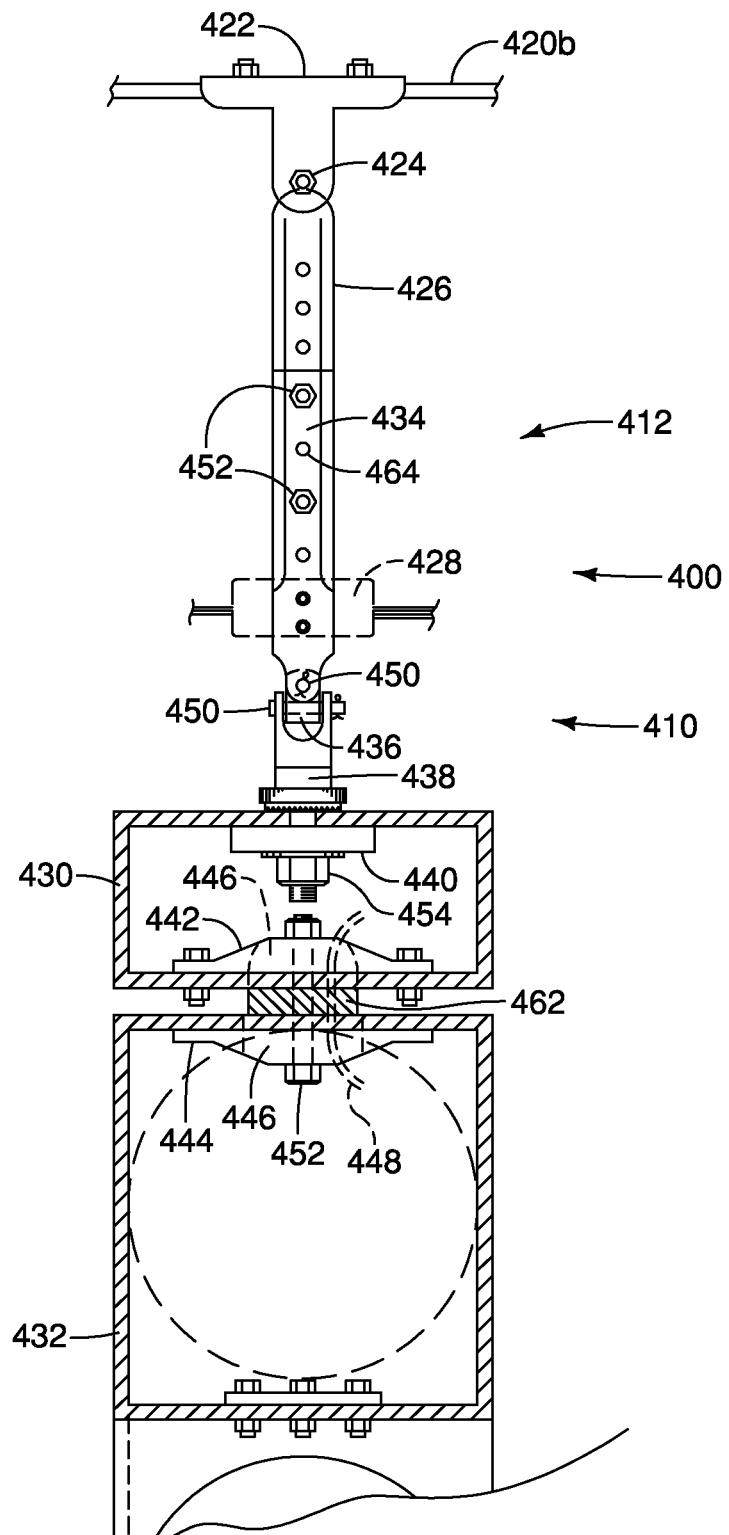
FIG. 23 is a front view of one embodiment of a retrofitted traffic control assembly of the present invention.

FIG. 23 illustrates an embodiment of the retrofitted traffic control assembly 410 including the connecting device 412 wherein the linking device 436 positioned below the lower span wire 420a of the traffic control assembly 400. The embodiment shown in FIG. 23 is similar to the embodiment shown in FIGS. 21 and 22 and includes the upper and lower stiffening members 442, 444 configured similarly to the embodiment described above. The upper connection device 434 is connected to the existing hanger 426 using fasteners 452 such as washers, bolts and nuts. The existing hanger 426 is suspended from the upper span wire 420b via the existing span wire clamp 422 and the existing pivot connection 424. In some embodiments, the upper connection device 434 may replace the hanger 426 and may be connected to the upper span wire 420b using the span wire saddle clamp 422.

In the embodiment shown in FIG. 23, the lower span wire 420a is connected to the upper connection device 434 using span wire tether clamp 428. The linking device 436 is positioned below the span wire 420a and operably connects the lower connection device 438 to the upper connection device 434 so that the upper and lower connection devices 434, 438 are movable relative to each other. In some embodiments, the linking device 436 may include two pivotable connections similar to the connections described above and shown in FIG. 28.

The connecting assembly 412 of the retrofit traffic control assembly 410 illustrated in FIG. 23 is shown in more detail in FIG. 26. The upper connection device 434 may include one or more apertures 437 that allow the length of the traffic control assembly 400 to be adjustable when the upper connection device 434 is connected to the hanger 426. The apertures 437 may be aligned with apertures on the hanger 426 to adjust the length of the entire assembly and to securely connect the upper connection device 434 and the hanger 426 using one or more fasteners 452 inserted through the aligned apertures. The first pivotable connection 481 and second pivotable connection 483 are also shown.

The lower connection device 438 may include the hub plate 441 that may be configured to receive the serrated boss 460 for the rotational alignment of the existing disconnect hanger 426 to the lower connection device 438. The lower connection device may also include one or more studs 458. The support plate 440 includes an aperture 484 through which the stud 458 inserts. The nut 454 and the washer 456 may be used to secure the support plate 440 to the traffic signal disconnect hanger (shown in FIG. 23) and onto the stud 458 of the lower connection device 438.

Figure 30:
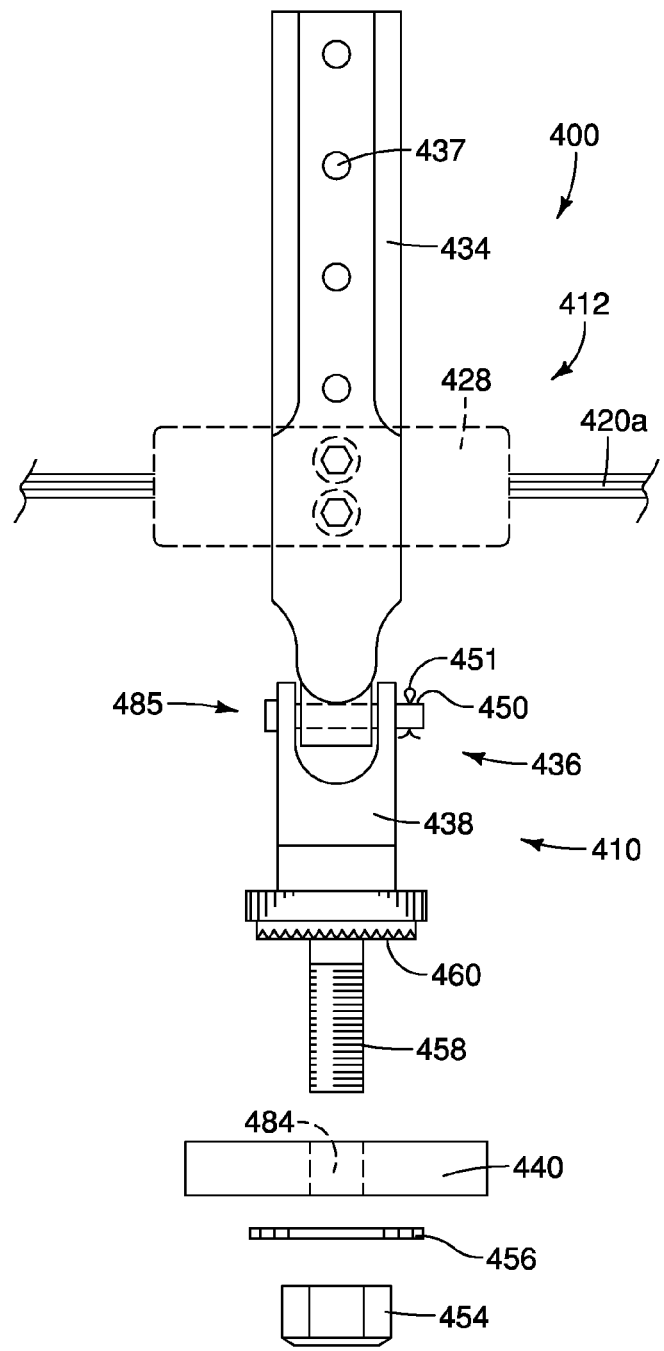
FIG. 30 is a front view of one embodiment of a connecting assembly of a retrofitted traffic control assembly.

FIG. 30 illustrates an embodiment of the connecting assembly 412 where the linking device 436 is shown positioned below the lower span wire 420a of the traffic control assembly 400. As shown in FIG. 30, the lower span wire 420a is connected to the upper connection device 434 using span wire tether clamp 428. The linking device 436 is positioned below the span wire 420a and operably connects the lower connection device 438 to the upper connection device 434 so that the upper and lower connection devices 434, 438 are movable relative to each other. The linking device 436 shown in FIG. 30 includes the first pivotable connection 485. The first pivotable connection 485 includes the pivot pin 450 and the cotter pin 451 holding the pivot pin 450 in position. In some embodiments, the pivot pin 450 extends along an axis parallel to an axis of the lower span wire 420a.

Similar to some of the embodiments described above, the embodiment of the connecting device 412 includes the lower connection device 438 that may include a hub plate 441 and may be configured to receive an integral serrated boss 460 for the rotational alignment of the existing disconnect hanger 426 to the lower connection device 438. The lower connection device may also include one or more studs 458. The support plate 440 includes an aperture 484 through which the stud 458 inserts. A nut 454 and a washer 456 may be used to secure the support plate 440 to the traffic signal disconnect hanger (shown in FIG. 21) and onto the stud 458 of the lower connection device 438. The retrofitted traffic control assembly 410 illustrated in FIG. 30 may also include a first stiffening member 442 and a second stiffening member 444 connected by a fastener 452 extending through the first stiffening member 442 and the second stiffening member 444 similar to the arrangement described in the embodiments above and shown in FIG. 23.

Figure 31:
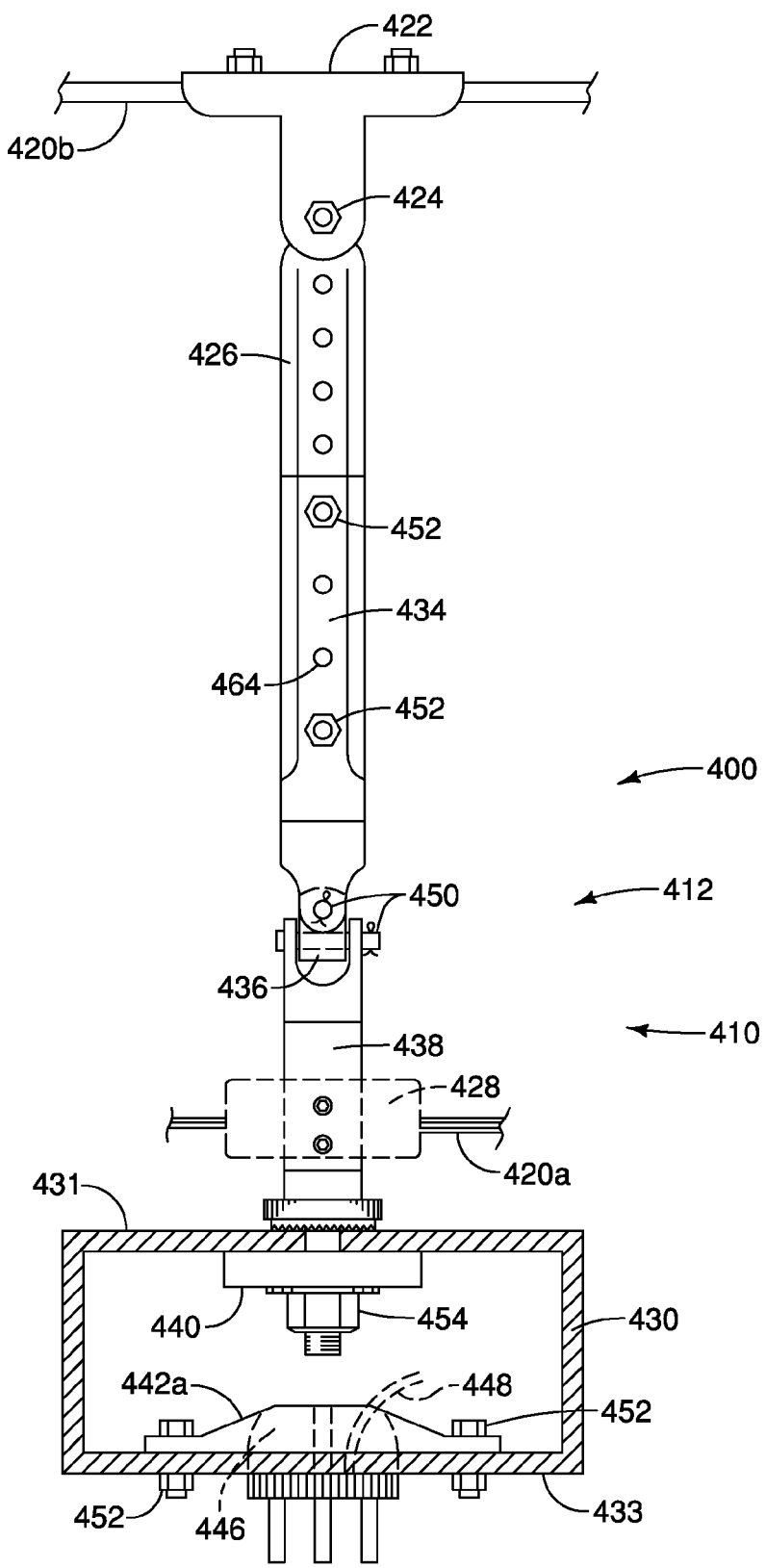
FIG. 31 is a front view of one embodiment of a retrofitted traffic control assembly of the present invention.

FIG. 31 illustrates an embodiment of the retrofitted traffic control assembly 410 that includes a stiffening member 442a provided in the traffic signal disconnect hanger 430 for strengthening the traffic signal disconnect hanger 430. The traffic signal disconnect hanger 430 may be connected to any type of signal or bracket suspended below the traffic signal disconnect hanger 430. As shown in FIG. 31, the stiffening member 442a is secured to the lower wall 433 of the traffic signal disconnect hanger 430 using one or more bolts 452, although any type of fastening mechanism may be used. The bolts 452 extend through the stiffening member 442a and the lower wall 433 to hold the stiffening member 442a in position. The connecting assembly 412 shown in FIG. 31 is similar to the device described above with reference to FIG. 22 but lacks the lower stiffening member 444. The stiffening member 442*a* may also be provided with the connecting assembly 412 as shown in the embodiments of FIGS. 23 and 30 that could be connected to any kind of signal or bracket.

According to some embodiments of the present invention, the wind resistance of a traffic control assembly is increased by providing a reinforcement device that includes a linking device that includes a spring-type support hanger. Without being limited to one theory, the spring-type support hanger may help distribute loading and associated stresses due to wind dynamic loads and gravitational wind-induced impact forces such as shock loads to increase the survivability of traffic signals during high wind evens such as hurricanes.

Figure 32:
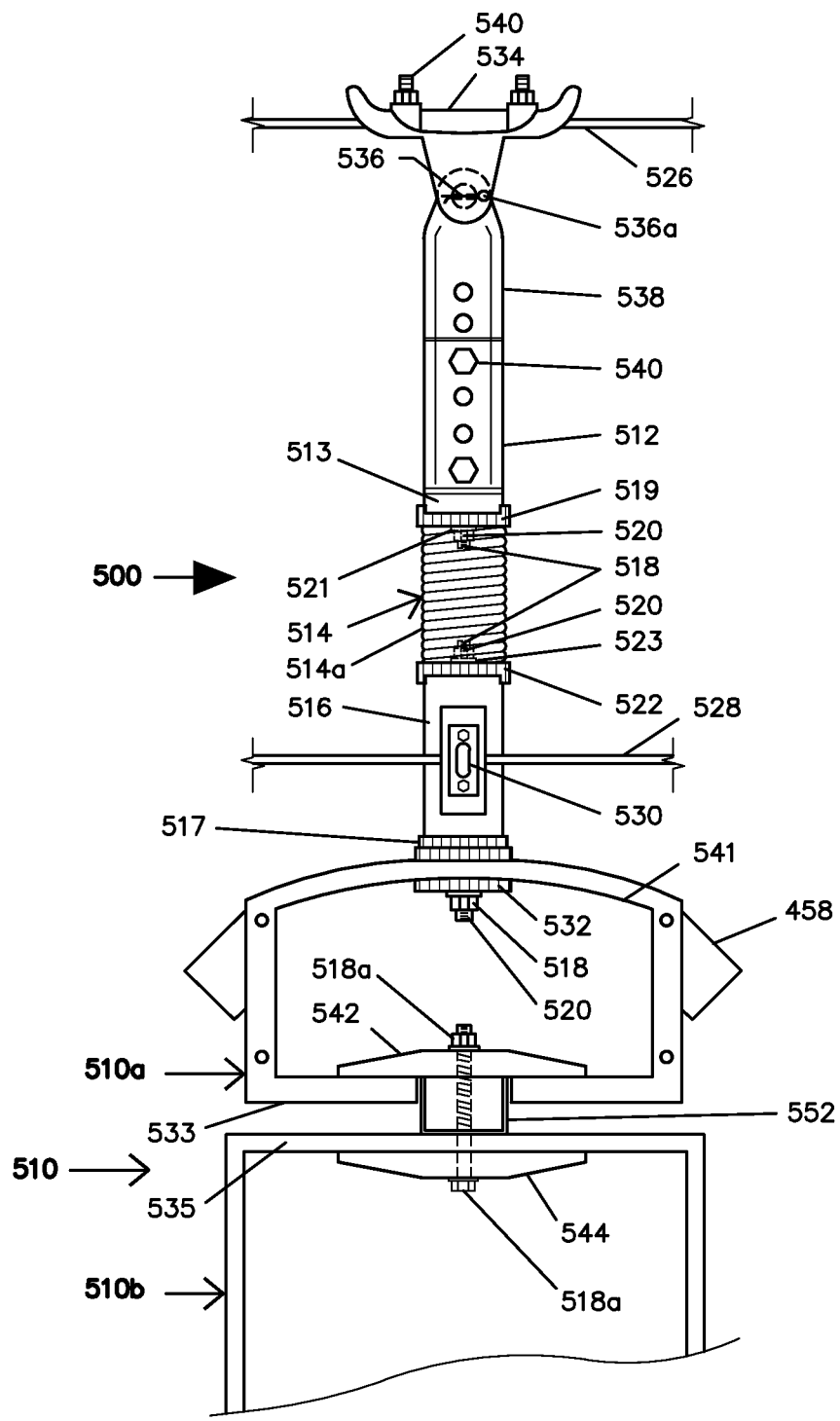
FIG. 32 is a front view of an embodiment of a traffic control assembly of the present invention.

An exemplary embodiment of a reinforcement device 500 for a traffic control assembly 510 is shown in FIG. 32. The traffic control assembly 510 includes a traffic signal disconnect hanger 510*a* and a traffic signal 510*b* positioned below the disconnect hanger 510*a*. The reinforcement device 500 includes an upper connection device 512 and a lower connection device 516. The upper connection device 512 and the lower connecting device 516 are connected by a linking device 514. As shown in FIG. 32, the linking device 514 may be provided as a spring-type support hanger 514. The spring-type support hanger 514 may be used with traffic control signals suspended with dual span wires 526, 528 as shown in FIG. 32 as well as with single wire suspension systems (not shown.) The linking device 514 may be any kind of device having a spring function that operably connects the upper and lower connection devices 512, 516 and can support the traffic signal disconnect hanger 510*a* and/or the traffic signal 510*b*. By way of non-limiting example, spring-type support hanger 514 can be of various types of spring 514*a* such as, but not limited to an extension spring (shown), a constant pitch spring, a variable pitch spring, a barrel spring or an hourglass spring. In some embodiments, strip or flat form type springs may be used instead of the exemplary coil type spring shown. In some embodiments, it may be desirable to have two or more spring-type support hangers 514.

The spring-type support hanger 514 is configured to serve at least two functions in preserving span wire traffic signal assemblies from breaking apart during hurricanes. The spring-type support hanger 514 may be configured to move rotationally and longitudinally with respect to the upper connection device 512. The spring-type hanger 514 may be configured to allow the traffic signal assembly 510 to rotate in various positions determined by the wind direction. The spring-type hanger 514 may be configured with a spring tensioning amount that limits the rotation during non-high wind events but is also designed to yield at higher wind speeds to reduce wind related damage by shedding the wind loads as the spring-type hanger 514 rotates. The spring-type hanger 514 may also be configured to mitigate wind-gust induced vertical impact loads.

In the most vertical position, the spring-type support hanger 514 is configured to greatly reduce the impact loads to the traffic signal assembly 510 below by transferring some, if not all, of the load to the spring-type support hanger 514 which in turn also transfers the load to the much stronger span wires 526 and 528. In the embodiments described herein having a spring-type support hanger 514, when the spring-type support hanger 514 is stretched, the hanger 514 stores elastic potential energy. The elastic potential energy is then transferred to kinetic energy when the wind pushes against the traffic signal assembly 510 and the spring-type support hanger 514 stretches in a curvatual manner, the kinetic energy of the traffic signal assembly 510 (wind upon its mass) gets converted into the potential energy of the spring-type support hanger 514, as a form of resistance.

With respect to primarily horizontal wind forces upon the traffic signal assembly 510, the spring-type support hanger's 514 conservation of energy should be determined based on equilibrium resulting from the traffic signal assembly's gravitation centering and weight of the assembly—no wind loads. Thus, when the spring-type support hanger 514 reaches its maximum potential energy (the strength of the spring) the kinetic energy (wind) of the traffic signal assembly 510 becomes at or near zero. When the wind force is removed, the spring-type support hanger 514 is configured to allow the traffic signal assembly 510 simply returns to its original position.

Figure 33:
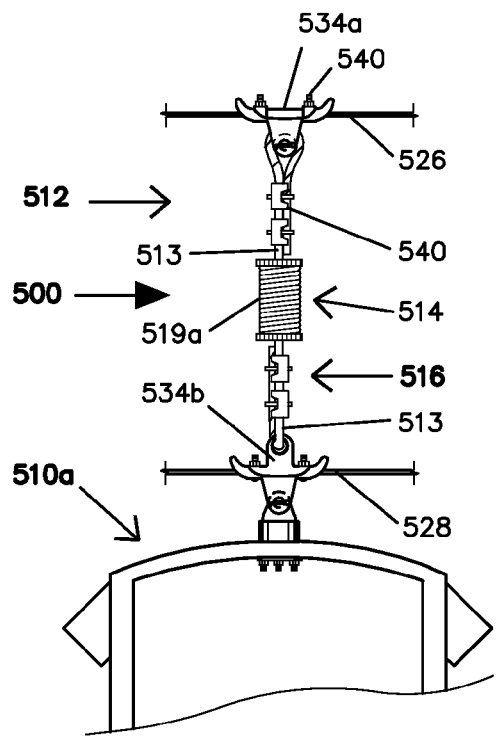
FIG. 33 is a front view of an embodiment of a traffic control assembly of the present invention using a cable hanger.
Figure 34:
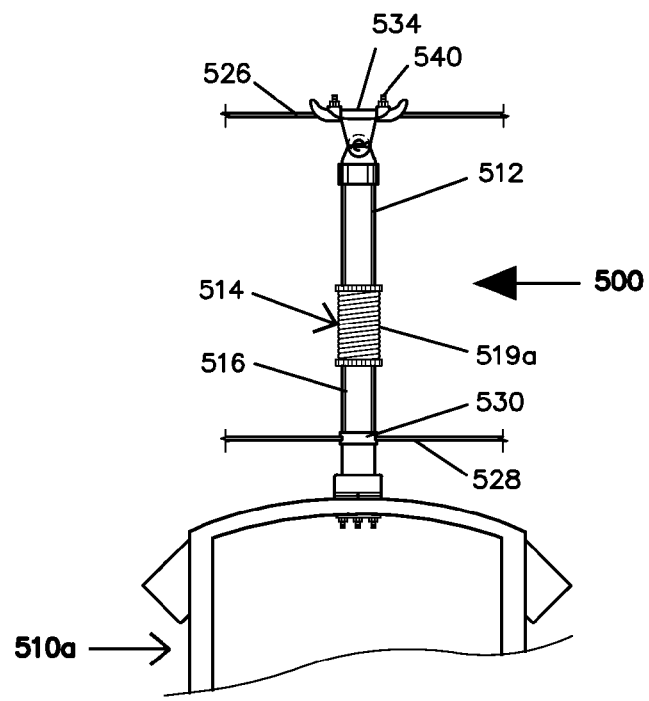
FIG. 34 is a front view of an embodiment of a traffic assembly of the present invention using a pipe hanger.

The spring-type support hanger 514 shown in FIGS. 32-34 as spring 514*a* is configured to perform as a "hinged connection" allowing the traffic control assembly 510 to rotate in different axes to the upper and lower span wires 526, 528. For example, when a wind force is applied to the traffic control assembly 510, the lower connection device 516 may begin to rotate about a clamping device 530 connected to the lower span wire 528 in a directional angle away from the earth. The upper connection device 512 is connected to the upper span wire 526 and thus the upper and lower connection devices 512, 516 move in a generally opposite direction to each other along a generally vertical plane. The spring-type support hanger 514 is configured to allow for rotation, to provide a pulling force for resistance and to mitigate wind-gravity induced vertical shock loads.

The properties of the spring-type support hanger 514 will depend on several factors and will be described with reference to an extension spring 514*a*, by way of non-limiting example, to determine the number of coils and the force provided. For example, these factors include initial tension, preload and extension distance. Additional factors may also be considered. The initial tension of the extension spring 514*a* is created during the manufacturing process as part of the winding process and is the internal force that holds the coils together. One way to measure initial tension is to determine the load necessary to overcome the internal force and begin coil separation. The preload refers to stretching the extension spring 514*a* a short distance from the spring's free state. The extension spring 514*a* will not provide any force until it begins to stretch. For the traffic control assembly 510, an exemplary preload may be based on the dead weight of the traffic control assembly 510. The extension distance is based upon the length of travel of the extension spring 514*a*. By way of non-limiting example, the spring 514*a* may extend between two span wires 526, 528 and be subject to wind-induced dynamic forces acting on the traffic control assembly supported by the two span wires 525, 528. Typically, the lower span wire 528 will not be taut and will include some amount of sag that will contribute to the length of travel of the extension spring 514*a*. The "sag distance" may be determined based on an average of a typical amount of sag between spaced apart poles and span wire weighs that contribute to the sag. The average "sag distance" can be used to specify a maximum range of rotational movement applicable to the travel distance of the spring 514*a*. The travel distance determines the amount of potential energy stored. The travel distance should not allow the spring 514*a* to overextend so that the spring 514*a* does not return to near the spring's 514*a* original length or to break.

An addition factor that may be considered is the shock load on the traffic signal assembly 510. Shock loading occurs when a load is applied with sufficient speed so that a portion of the coils of the spring take up more of the load than calculated for a static situation. The factors to consider for the properties of the spring-type support hanger 514 will vary depending on the number of span wires, the type of traffic signal assemblies and the typical wind zones as well as low stress and high stress cycles for each hanger 514.

The spring-type support hanger 514 may be connected to the traffic control assembly 510 as shown in FIG. 32 and described below. Starting at the top span wire 526 a saddle clamp 534 is fastened securely to the span wire 526 utilizing fasteners 540. A first extension hanger 538 is mutually connected to the saddle clamp 534 utilizing a clevis pin 536 secured with a cotter pin 536*a*. The upper connection device 512 is adjusted to the desired vertical positioning and then fastened to the existing extension hanger 538 utilizing appropriate fasteners 540. A lower end portion 513 of the upper connection device 512 may be connected to the spring-type support hanger 514 utilizing an embedded stud 518 of the upper connection device 512 that is connected to a receiving aperture 521 in a flange 519 of the spring-type support hanger 514. The flange 519 may be connected to the spring-type support hanger 514 by any appropriate means such as welding or a split ring enfoldment arrangement or in some instances both.

The lower connection device 516 of the reinforcement device 500 may be similarly connected to the spring-type support hanger 514 as described above for the upper connection device 512 including an embedded stud 520 and a flange 522 having an aperture 523. The lower connection device 516 is configured to be connected to the lower span wire 528 when a lower span wire is present. The connection to the lower span wire may be made using a "U-bolt" clamping device 530 over span wire 528 and fastened as appropriate.

The lower connection device 516 may include a serrated hub portion 517 that is connectable to the traffic signal disconnect hanger 510*a* or in some embodiments to a traffic signal housing 510*b* or to a single unit (disconnect and signal housing) not shown. The lower connection device 516 may include an embedded stud 520 that may be placed through a roof 541 of the traffic signal disconnect hanger 510*a* as shown in FIG. 32 or a traffic signal head (not shown). The embedded stud 520 may be secured by using the fastener 518. In some embodiments, the fastener 518 may be a nylon insert lock nut. In some embodiments, the reinforcement device 500 may include a stiffening member connected to an upper wall 541 of the traffic signal disconnect hanger 510*a*.

In some embodiments, the reinforcement device 500 may include a first stiffening member 542 and a second stiffening member 544 connected by a fastener 518*a* extending through the first stiffening member 542 and the second stiffening member 544 for strengthening the traffic control assembly 510 similar to the arrangement described in the embodiments above. The first stiffening member 542 may be operably connected to a lower wall 533 of the existing disconnect hanger 510*a* and the second stiffening member may be operably connected to an upper wall 535 of an existing traffic signal 510*b*. The first and second stiffening members 542, 544 may be attached to or incorporated into the disconnect hanger 510*a* and traffic signal 510*b* respectively, by any method known to one skilled in the art. Similar to the first and second stiffening members discussed and shown above, the first and second stiffening members 542, 544 may each include an aperture formed in an edge of the members for accommodating existing wires of the traffic control assembly 510. The apertures allow for the stiffening members 542, 544 to be retrofit into the disconnect hanger 510*a* and the traffic signal 510*b*, respectively, without disconnecting the wires during the retrofitting process.

In some embodiments of the present invention, the stiffening members 542, 544 are connected by a fastening assembly 518*a* that includes an elongated bolt, a nut, and washer, such as a lock washer. However, any suitable fastening mechanism or assembly may be used. In the embodiment of FIG. 32, the elongated bolt 518*a* connects an upper stiffening plate 542 associated with a traffic signal disconnect hanger 510*a* to a lower stiffening plate 544 associated with a traffic signal 510*b* by extending through an aperture in the upper stiffening plate 544, through a hub 552 associated with the disconnect hanger 510*a*, and through an aperture in the lower stiffening plate 544. Similar to the embodiments described above, the nut and washer may be used to compress the assembly and obtain a moisture-resistant connection that maintains a predetermined degree of tension over time and withstands high wind forces.

FIG. 33 illustrates an embodiment of the reinforcement device 500. The reinforcement device 500 includes the upper connection device 512 and the lower connection device 516 operably connected to the linking device 514. Similar to the embodiment described above, the linking device 514 may be provided as a spring-type support hanger 514. In the embodiment shown in FIG. 33, the upper connection device 512 may be provided as a standard drop cable hanger 513 sometimes used instead of flat hangers described. In some embodiments, the lower connection device 516 may be provided as the drop cable hanger 513. As shown in FIG. 33, both the upper and lower connection devices 512, 516 may be provided as the drop cable hanger 513. In some embodiments, the upper and the lower connection devices 512, 516 may be provided as different devices. By way of non-limiting example, the upper connection device 512 may be provided as one of the drop cable hanger 513 or the flat hanger 512 and the lower connecting device may be provided as the other of the drop cable hanger 513 or the flat hanger 512.

The embodiment shown in FIG. 33, the saddle clamps 534*a*, 534*b* may be used to operably connect the reinforcement device 500 to the upper and lower span wires 526, 528, respectively. The saddle clamp 534*b* may also be used to operatively connect the traffic signal disconnect hanger 510*a* to the reinforcement device 510*a* so that the traffic signal assembly 510*a* is suspended below the lower span wire 528 (only the traffic signal disconnect hanger 510*a* is shown in FIG. 33). In the embodiment shown in FIG. 33, the drop cable hangers 513 allow the traffic signal assembly 510 to rotate so the horizontal loads may be lessened. In this embodiment, the linking device 514 may be configured to greatly reduce the impact loads in the vertical direction to the traffic signal assembly 510 below by transferring some, if not all, of the load to the spring-type support hanger 514 which in turn also transfers the load to the much stronger span wires 526 and 528 similar to the transfer of energy described above with reference to FIG. 32.

The embodiment shown in FIG. 33 may include additional features described above with reference to other embodiments. By way of non-limiting example, the reinforcement device 500 may include a first stiffening member, a second stiffing member or both a first and second stiffening members.

FIG. 34 illustrates an embodiment of the reinforcement device 500. The reinforcement device shown in FIG. 34 is similar to the embodiments described above except for the upper and lower connecting devices 512, 516 which are provides as a rigid pipe instead of the flat hanger or the drop cable hanger described above. FIG. 3 represents a third embodiment of the present invention 10 utilizing a rigid pipe in lieu of the previously described flat and cable type hangers. Similar to the embodiment described above, the reinforcement device 500 includes the upper connection device 512 and the lower connection device 516 operably connected to the linking device 514 where the linking device 514 may be provided as a spring-type support hanger 514.

The spring 514a may be made from any material known in the art having suitable properties to support a traffic signal control assembly 510. Non-limiting examples include metals and in particular stainless steel such as types 302, 304, 316 and combinations thereof. In certain embodiments of the present invention, the traffic control assembly satisfies all requirements of the relevant regulatory authorities; can be installed rapidly and easily without requiring any electrical changes disconnections, or reconnections; and can, surprisingly, withstand wind forces of at least about 50 miles per hour, 75 miles per hour, 120 miles per hour, or even 140 miles per hour. In certain embodiments, the traffic control assembly can withstand hurricane wind forces of greater than 150 miles per hour.

According to some embodiments of the present invention, the wind resistance of a traffic control assembly is increased by spreading and transferring the torsional loads and the vertical impact loads to the span wire support system. Adding more load and creating additional stresses to the poles and span wire is in direct contrast to the current structural design standards where the load to the span wire system is minimized. In some embodiments of the present invention, about 50% or more of the wind load may be transferred to a lower, stronger portion of a traffic signal pole.

Figure 35:
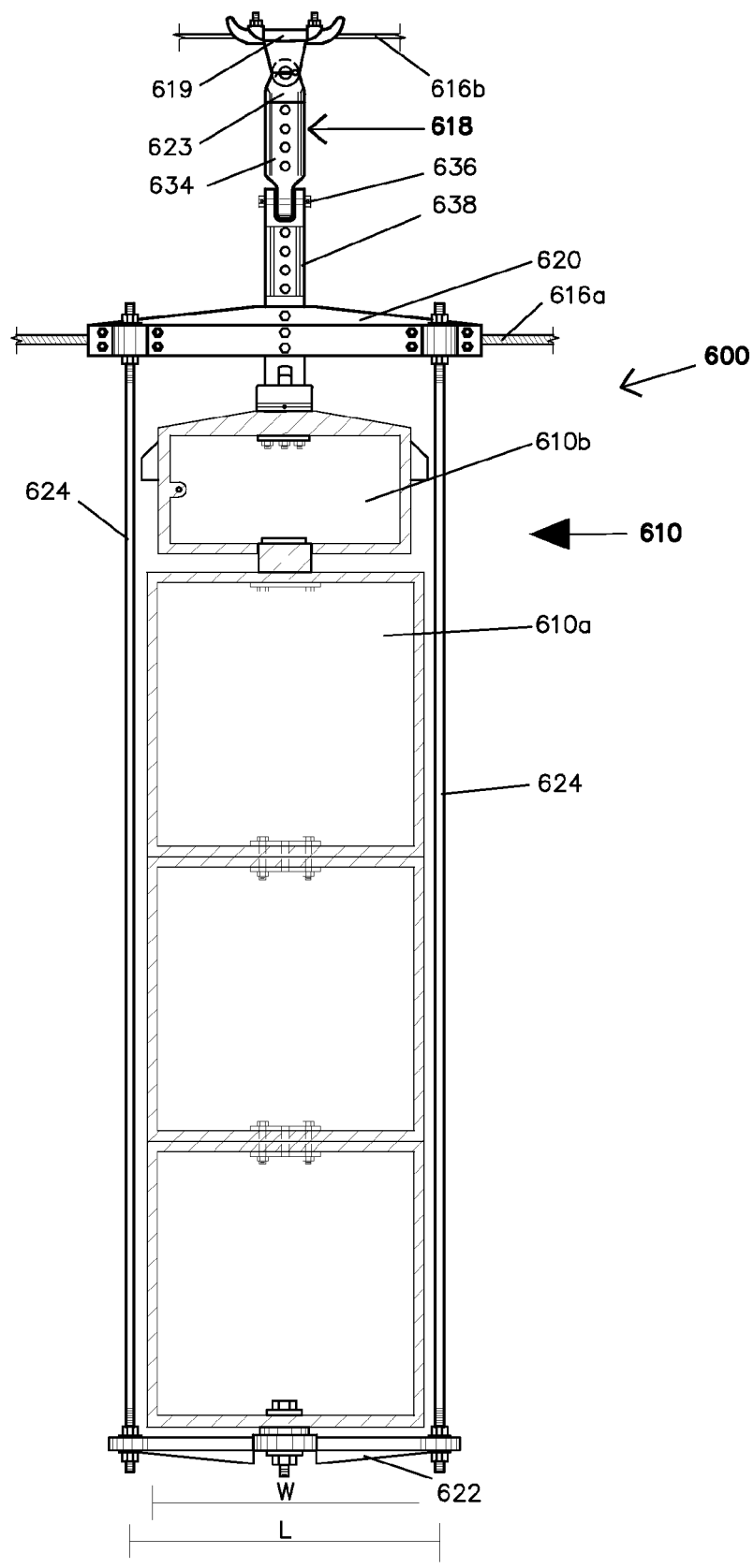
FIG. 35 is a front view of an embodiment of a reinforcement device retrofit onto a traffic signal control assembly.

FIG. 35 illustrates an embodiment of a reinforcement device 600 for a traffic control assembly 610 that may be used with a dual span wire system including a lower span wire 616a or messenger wire and an upper span wire 616b or cantenary wire. The traffic signal control assembly 610 includes a disconnect hanger 610b and a traffic signal 610a, although the reinforcement device 600 may also be used with the traffic signal 610a alone. FIG. 35 illustrates the lower span wire 616a and the upper span wire 616b with a connecting assembly 618 extending between the upper and lower span wires 616a, 616b. The connecting assembly 618 may be any of the connecting devices described herein and shown in FIGS. 17-34. By way of non-limiting example, a pivotal type connecting assembly such as the hanger devices shown in FIGS. 19 and 29 may be used as part of the reinforcement device 600. In some embodiments, a vertical tether cable may be used between the upper span wire 616b and the lower span wire 616a (see FIG. 2). The connecting assembly 618 is shown connected to the upper span wire 616b with an existing hanger extension 623 and an existing clamp 619, such as a saddle clamp. The connecting assembly 618 also includes an upper connection device 634, a linking device 636 and a lower connection device 638. The connecting assembly 618 may be connected to an existing hanger system similar to the connecting assemblies described above (see for example FIGS. 17 and 18).

The reinforcement system 600 may be configured to be retrofit with an existing traffic signal similar to the reinforcement systems described above. The reinforcement device 600 includes an upper support device 620 and a lower support device 622. The upper support device 620 may be provided as a span wire clamp that connects to the lower span wire 616a and spreads the load to the span wire 616a. The upper and lower support devices 620, 622 are connected by vertical support members 624 extending on each side of the traffic control assembly 610. In some embodiments, the reinforcement device 600 may be configured to create a compression-type assembly that resists torsional forces and wind-induced shock loads. The upper support device provided in the form of the load-spreading span wire clamp 620 may be configured to resist and mitigate wind induced torsional forces (increasing the lateral span wire connection by at least a factor of about 10 and in some embodiments by at least a factor of about 15). The load-spreading span wire clamp 620 may be configured to increase the points of attachment by 2 and in some embodiments by 4 and/or configured to transfer torsional and vertical shock loads from the traffic signal assembly to the stronger span wire support system. As shown in FIG. 35, in some embodiments, the length L of the upper support device 620 and the lower support device 622 may be longer than the width W of the traffic control assembly 610. In some embodiments, the vertical support members 624 may extend between the upper support device 620 and the lower support device 622 without contacting the traffic control assembly 610. When the upper support device 620, the lower support device 622 and the vertical support members 624 are connected, tension is placed on the vertical support members that holds the traffic assembly in compression.

Figure 36:
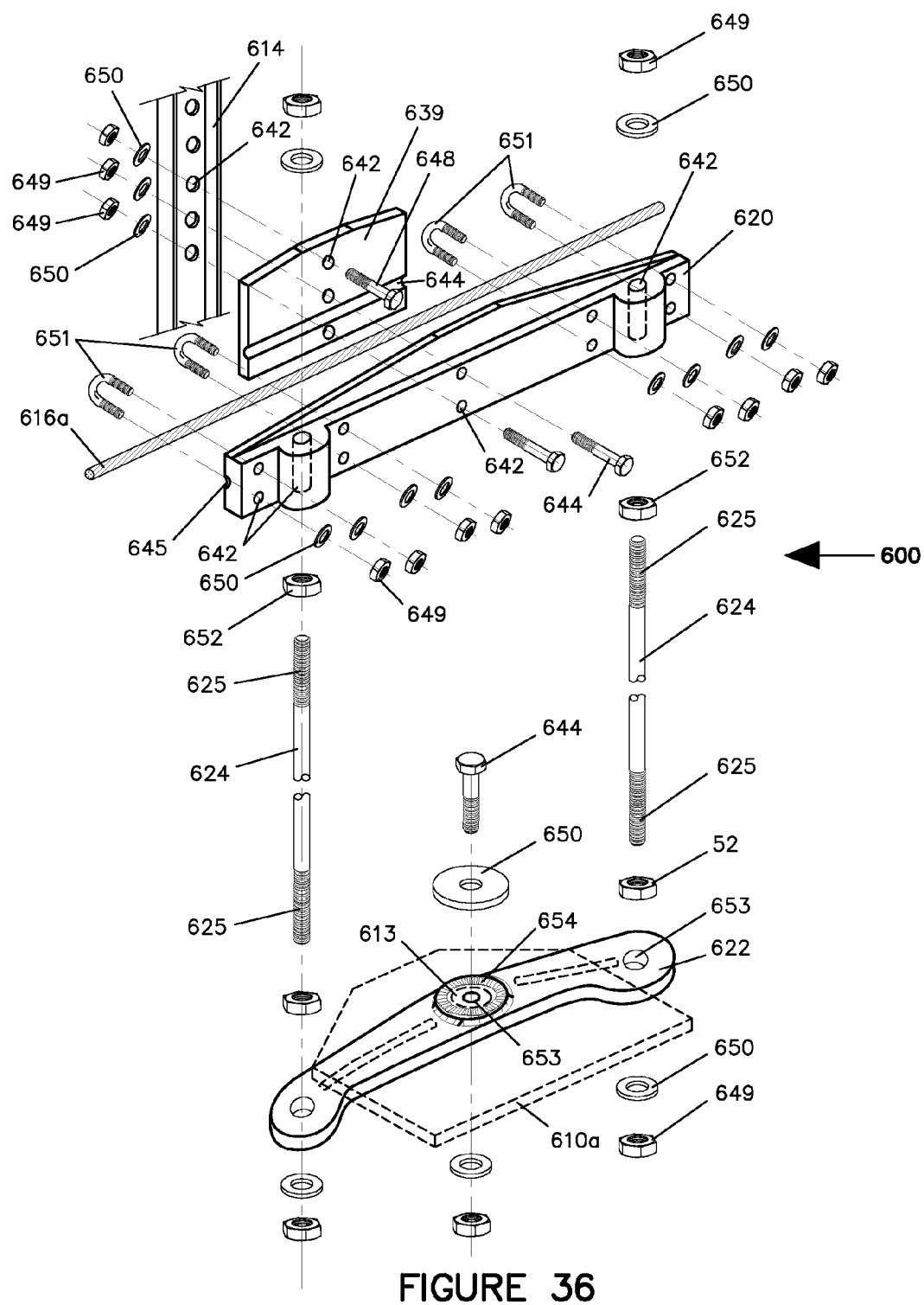
FIG. 36 is an exploded view of the reinforcement device shown in FIG. 35.

An exploded view of an embodiment of the reinforcement device 600 including the upper support device 620 provided as a span wire clamp, the lower support device 622 and the vertical support members 624 is shown in FIG. 36. For reference, a hanger 614, the lower span wire 616a and the traffic signal 610a are shown. A span wire engagement plate 639 may be connected to the hanger 614 or alternatively formed integrally with the lower connecting device as described in detail below. The span wire engagement plate 639 may be connected to the lower connecting device 638 using one of more bolts 644 positioned through openings 642 and secured with a nut 649 over a washer 650. The span wire engagement plate 639 may include a groove 646 configured to receive at least a portion of the lower span wire 616a. The load spreading span wire clamp 620 may be generally rectangularly shaped although other elongate shapes may also be used. In some embodiments, the load spreading span wire clamp 620 also may include a groove 645 configured to receive at least a portion of the lower span wire 616a. The clamp 620 may be connected to the hanger 614 and the span wire engagement plate 639 with the lower span wire 616a positioned in the grooves 644, 645 using bolts 644 extending through openings 642 in the clamp 620 and the span wire engagement plate 639 with nuts 649 and washers 650 securing the clamp 620 to the span wire engagement plate 639. Other connections are also possible.

The load spreading span wire clamp 620 may be connected to the lower span wire 616a using u- or j-shaped bolts 651 that extend over the span wire 616a and through the openings 642 in the load spreading span wire clamp 620. Washers 650 and nuts 649 may be used to secure the bolts 651 to the load spreading span wire clamp 620. The load spreading span wire clamp 620 also may include additional openings 642 for receiving the vertical members 624 there through. In some embodiments, the vertical members 624 may include threaded ends 625 that may be secured through the openings 642 in the load spreading span wire clamp 620 using washers 650 and nuts 649. Stay nuts 652 may also be included to secure the vertical members 624 to the load spreading span wire clamp 620.

The lower support device 622 is also shown in FIG. 36. The lower support device 622 may be secured to the traffic signal 610a using a bolt 644 inserted through an opening 613 in the traffic signal 610a, through the washer 650 and through opening 653 in the lower support device 622. The bolt 644 maybe secured using the washer 650 and the nut 649. The lower support device 622 may include serrations 654 to mate with serrations on the traffic signal 610a (not shown). The vertical member 624 may be secured to the lower support device 622 by inserting the vertical members through openings 653 in the lower support device 622 and securing the vertical members 624 with washers 650 and nuts 649. In some embodiments, stay nuts 652 may also be included to secure the vertical members 624 to the lower support device 622.

The vertical members 624 may have a round, tubular, angular, square shape or the like. In some embodiments, the vertical support members 624 may include a three sided channel. In some embodiments, the vertical member 624 may be provided as rods or cables. The vertical members 624 may be made from any suitable material. By way of non-limiting example, the vertical members may be made of stainless steel such as SS 304 or SS 316.

Figure 46:
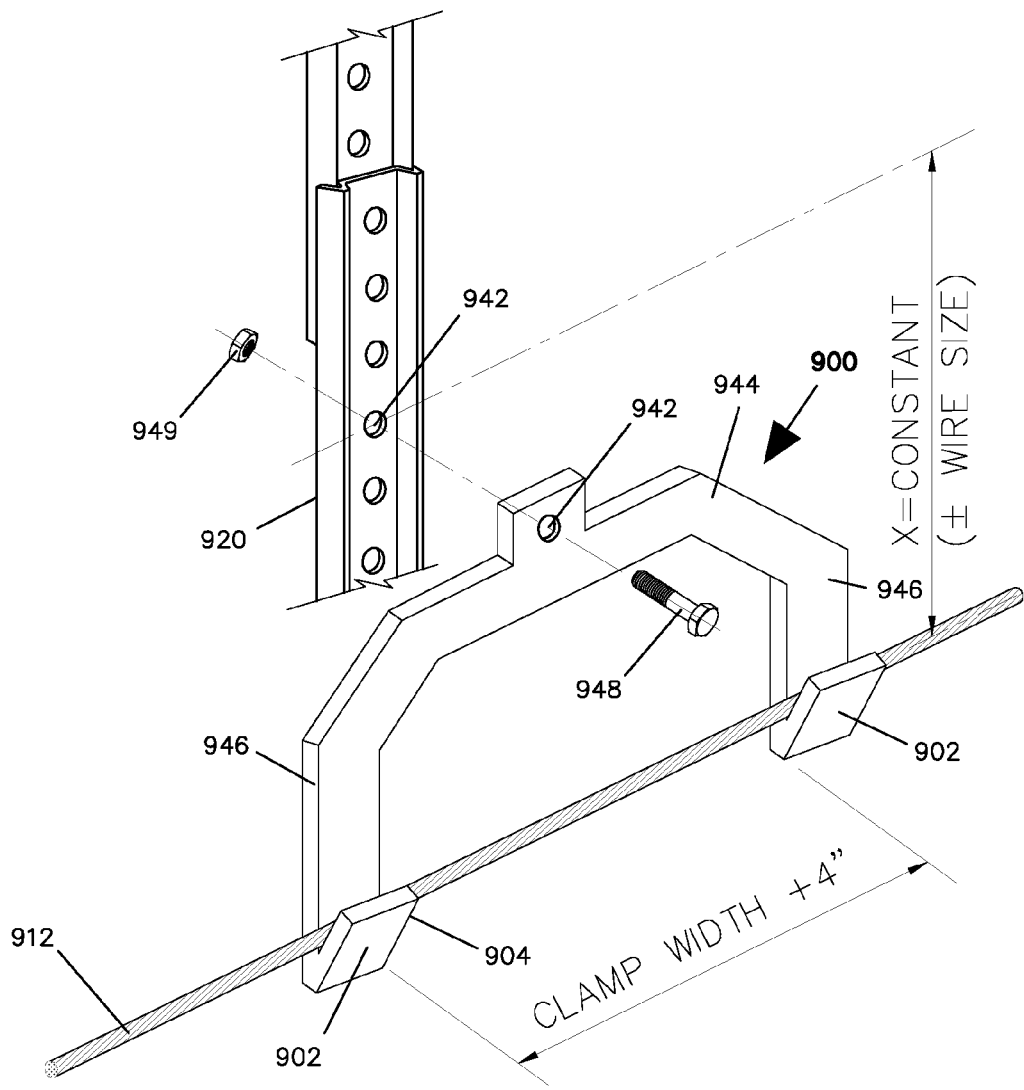
FIG. 46 is a perspective view of an embodiment temporary suspension device.

The reinforcement device 600 may be installed by temporarily securing and maintaining the vertical distance between the upper span wire 616b and the lower span wire 616a. A temporary suspension device may be used to temporarily secure the traffic signal control assembly 610. The temporary suspension device is shown in FIG. 46 and described below. Once the traffic signal control assembly 610 is temporarily secured, the connecting assembly 618 (shown in FIG. 35) may be installed. The span wire engagement plate 639 may be connected to the connecting assembly 618 or integrally provided therewith. The upper support device 620 and the lower support device 622 are loosely assembled on the ground with the vertical members 624. The reinforcement device 600 is placed over the lower span wire 616a mating the upper support device 620 to the span wire engagement plate 639 and securing the lower span wire 616a therebetween. The temporary suspension device is removed. The lower support device 622 is connected to the traffic signal 610a so that the lower support device 622 and the upper support device 620 are generally aligned. The vertical members 624 are then adjusted and tightened to a predetermined tension range depending on the type of traffic signal control assembly 610, i.e. plastic or metal type housing.

Figures 37, 38:
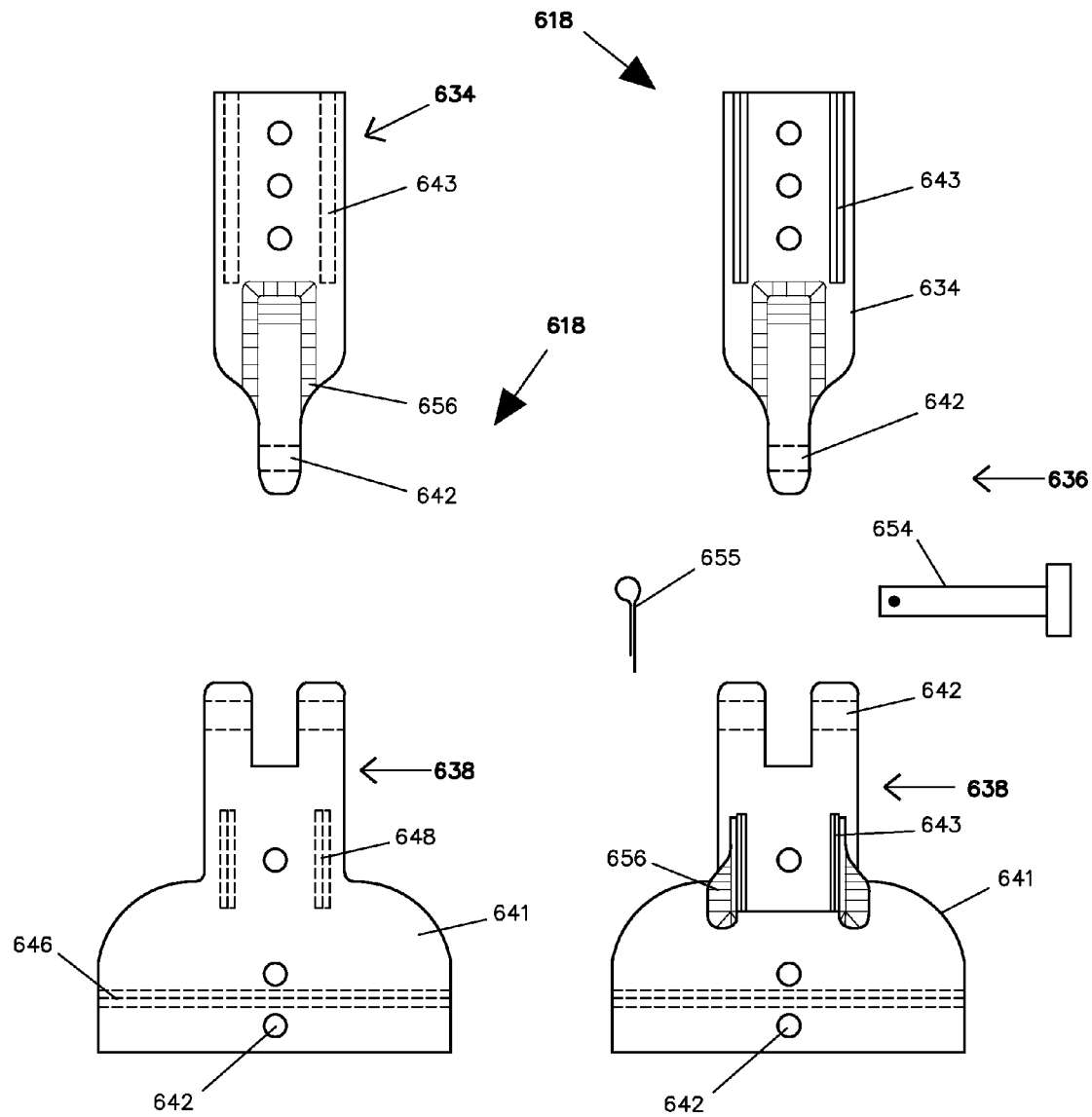
FIG. 37 is a front view of an embodiment of a connecting assembly.
FIG. 38 is a back view of the connecting assembly shown in FIG. 37.
Figure 39:
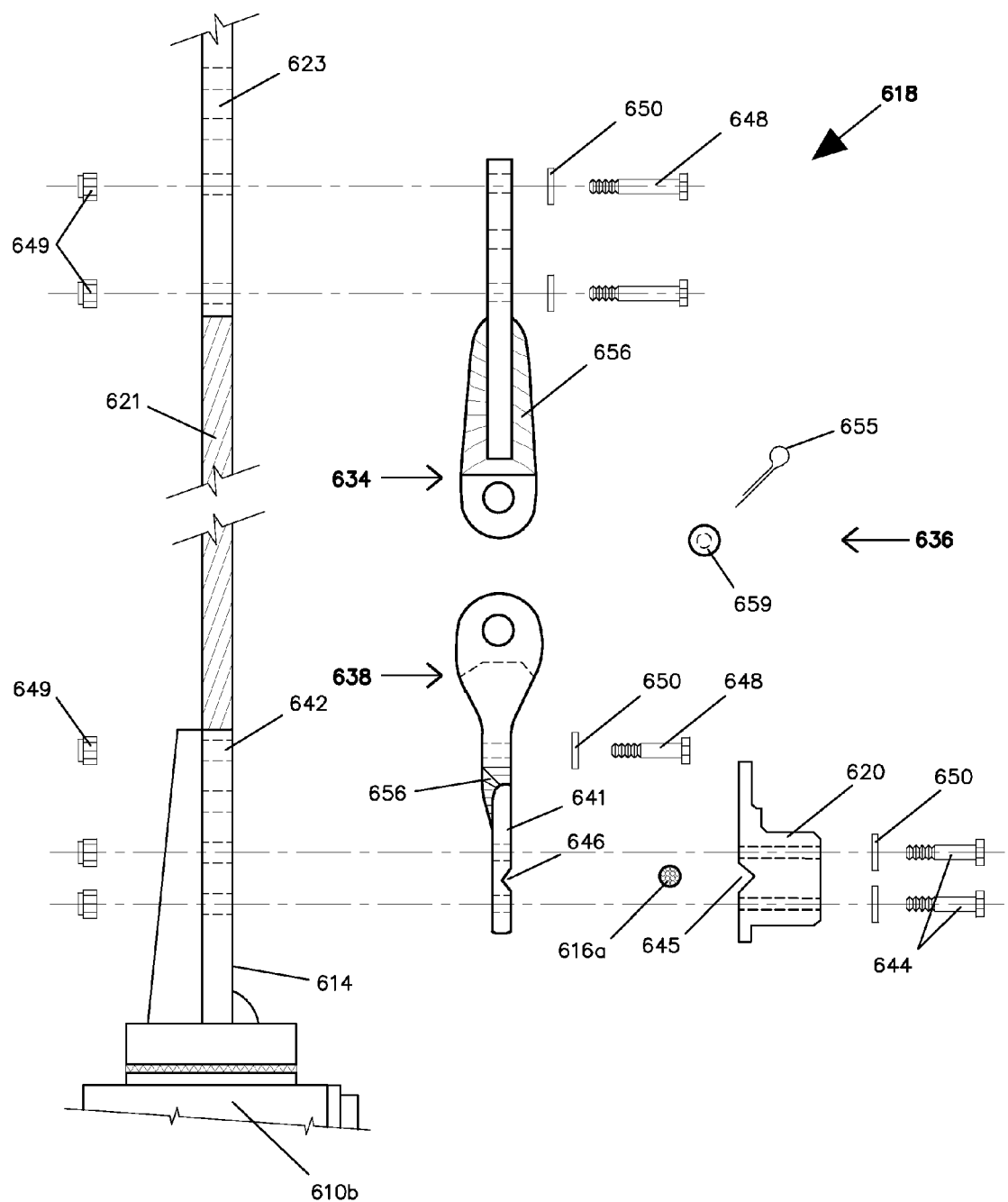
FIG. 39 is an exploded view of an embodiment of a connecting assembly.

FIGS. 37, 38 and 39 illustrate an embodiment of the connecting device 618 showing an integral span wire engagement plate 641 with the connecting device 618. Similar to the device shown in FIG. 35, the connecting assembly 618 includes the upper connection device 634, the linking device 636 and the lower connection device 638. The span wire engagement plate 641 is formed integrally with the lower connection device 638. The connecting assembly 618 may be connected to an existing hanger similar to the connecting assemblies described above. The span wire engagement plate 641 of the lower connection device 638 may include the groove 646 configured to receive at least a portion of the lower span wire 616a. The groove 646 may be configured to cooperate with the groove 645 of the load spreading span wire clamp 620 (shown in FIG. 35). The clamp 620 may be connected to the hanger 614 and the span wire engagement plate 641 of the lower with the lower span wire 616a positioned in the grooves 646, 645 using bolts 644 extending through openings 642 in the clamp 620 and the span wire engagement plate 641 with nuts 649 and washers 650 securing the clamp 620 to the span wire engagement plate 641 similar to the connections described above. Other connections are also possible.

FIG. 37 illustrates a front view of the connecting device 618 and FIG. 38 illustrates a back view of the device shown in FIG. 37. In some embodiments, the upper and lower connecting devices 634, 638 may include v-shaped mating grooves 643. As shown in FIGS. 37 and 38, integral reinforcements 656 may also be included on the upper connecting device 634 and/or the lower connecting device 638. The integral reinforcements 686 may be used to add strength and eliminate stress connection points such as 90° inside corners. An embodiment of the linking device 636 is shown in FIG. 38. The linking device includes a pivot pin 654 that is positionable through the openings 642 in the upper and lower connecting devices 634, 638. A cotter pin 655 may be used to secure the pivot pin 654 in position.

FIG. 39 illustrates an exploded view the connecting device 618. FIG. 39 also shows a portion of the existing hanger system 621 that is replaced by the upper connection device 634 and the lower connection device 636 having the integral span wire engagement plate 641. A tri-stud hanger 614 is also shown and is similar to the tri-stud hangers described above.

Figure 40:
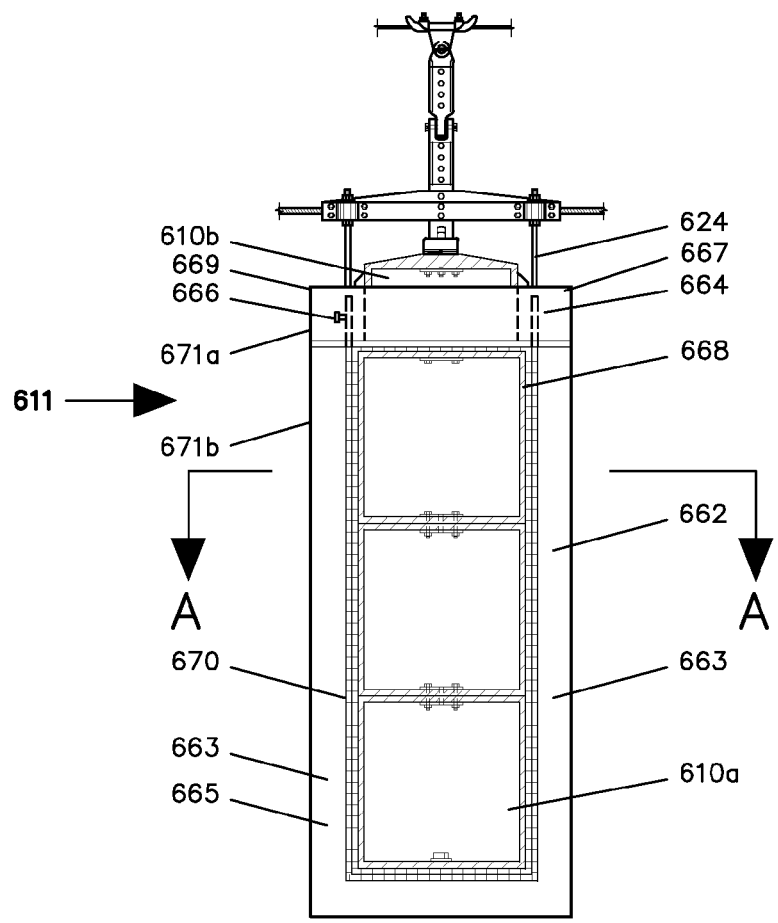
FIG. 40 is a front view of an embodiment of a reinforcement device and a backplate assembly retrofit onto a traffic signal control assembly.

FIG. 40 illustrates an embodiment of the reinforcement device 600 that includes a backplate system 611. The backplate system 611 includes a backplate 662 that may be provided with the devices described herein. By way of non-limiting example, the backplate 662 may be provided with the reinforcement device including the upper support device 620, the lower support device 622, and the vertical members 624 described above. In some embodiments, a backplate cover 664 may also be provided with the backplate 622. The backplate 662 and the backplate cover 664 provide a four-sided fully surrounded traffic signal that previously was not possible with a dual span wire system, especially with traffic signal control assemblies using a disconnect hanger due to the required access to the electrical components in the disconnect hanger. In some embodiments, the surface connection area for the backplate 662 may be increased compared to current the current attachment configuration. By way of non-limiting example, the surface connection area may be about 210 square inches compared to less than one square inch in current devices.

As shown in FIG. 40, the backplate system 611 includes the backplate 662, the backplate cover 664 and may also include infill sweeps 668, offset attachment ribs 670 and a latch 666. The backplate 662 may include three faces 663 that surround the sides and bottom of the traffic signal. The faces 663 have a surface area 665 that is viewable when viewing the traffic signal lights. The backplate cover 664 includes a face 667 that comprises the fourth face of the backplate system 611 and has a surface area 669 that is viewable when viewing the traffic signal lights. A retroreflective border may also be provided on one or more of the faces of the backplate 662 and/or the backplate cover 664. The backplate cover 664 provides access to the disconnect hanger 610b using the vertical member 624 as a pivot for opening and closing the backplate cover 664 and the latch 666 secures the cover 664 in the closed position. In some embodiments, the backplate 662 and backplate cover 664 may be made from plastic and the vertical members 624 and upper and lower support devices 620, 622 made from metal. A mold/manufacturing process may be used to form the backplate system 611 and the reinforcement device 600 may be connected into the backplate system 611. The backplate system 611 allows for a reduction or elimination of stresses on attachment points to the traffic signal control assembly 610 that are created from the extra wind loading produced from the increased surface area from the backplate 662. The backplate system 611 described herein eliminates or reduces the need for fasteners that can weaken the connection such as self-tapping screws that attach the backplate 662 to the traffic signal control assembly 610.

Figure 41:
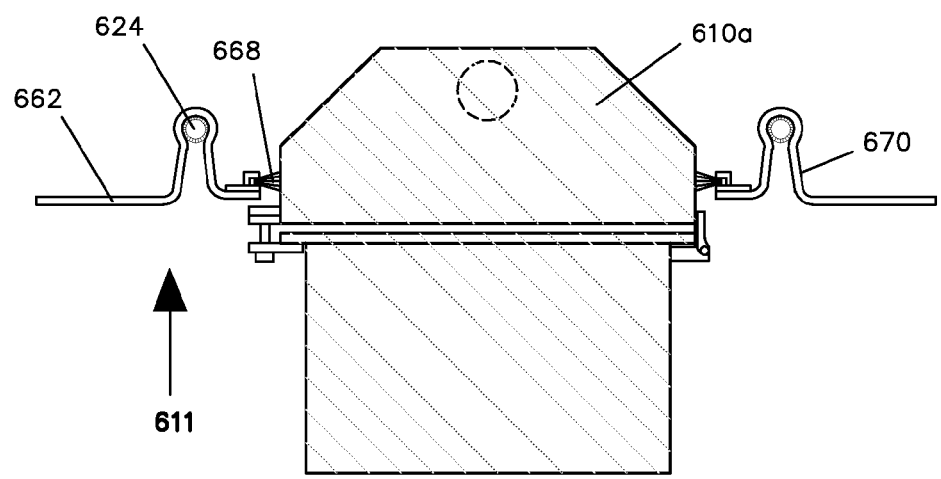
FIG. 41 is a sectional view through A-A of FIG. 40.

FIG. 41 shows a cross-sectional view taken along A-A of FIG. 39. For reference the traffic signal 610a is shown. As shown in FIG. 41, as part of the manufacturing process offset attachment ribs 670 are formed to provide a desired front to back depth allowing an attachment point common to most if not all traffic signal control assemblies. The offset attachment ribs 670 are formed so that the vertical members 624 of the reinforcement device 600 by extend through the offset attachment ribs 670. The infill sweeps 668 provide a way to seal the light between the backplate 662 and the traffic signal 610a. The infill sweeps 668 also allow for differential sizing adjustments for various traffic signal sizes. In some embodiments, the backplate 662 may also include horizontal offset ribs that may connect to the vertical offset attachment ribs 670. One or a pair horizontal offset ribs may be provided across the base of the backplate 662 and/or across the top of the backplate 662 so that the top horizontal offset rib is positioned within the space between the traffic signal 610a and the disconnect hanger 610b. A complimentary flange that can mate with the top horizontal offset rib may be included in the backplate cover 664 so that the flange fits in the offset rib when the cover is secured.

Figure 42:
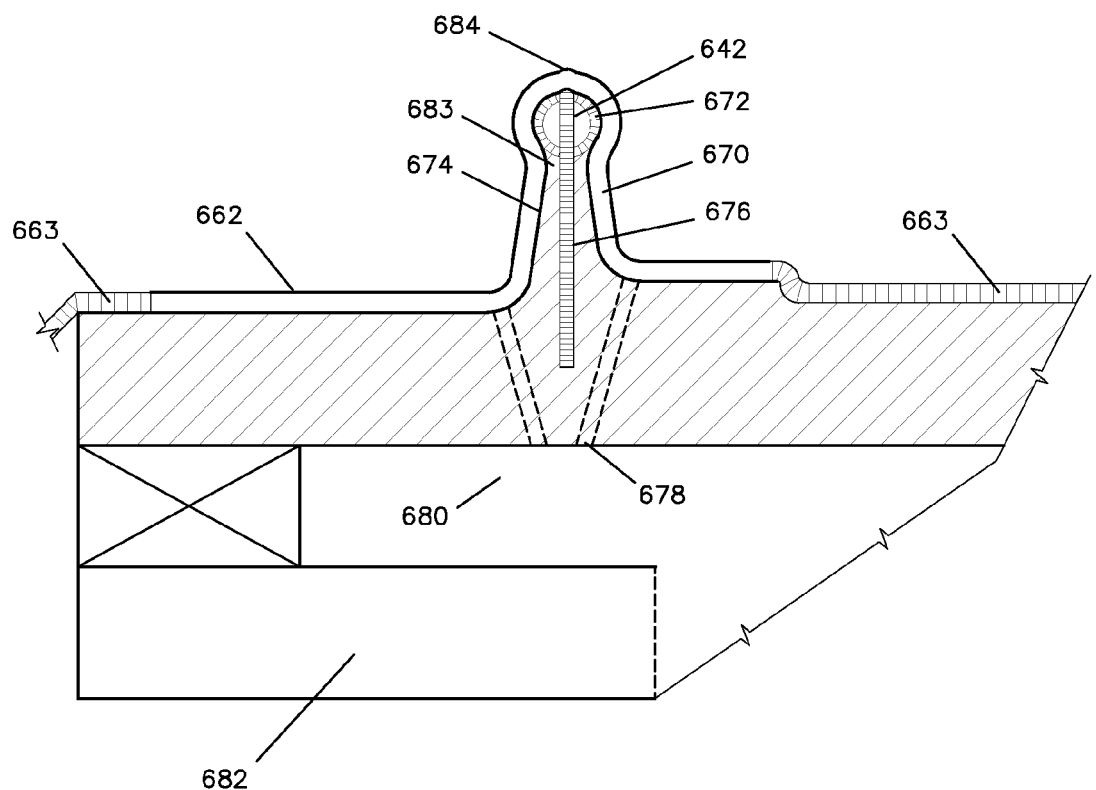
FIG. 42 is a sectional view of an embodiment of a mold to form and embodiment of a backplate.

FIG. 42 illustrates an enlarged cross section showing the backplate 662 held by a vacuum as part of the backplate thermoforming process. A mold 682 provides a positive surface area 674 that includes the final area from the backplate 662 and a trim area 663 for final fabrication and appropriate sizing. The mold 682 also provides a vacuum chamber 680 and air evacuation holes 678. The mold 682 further includes integral placement pins 676 for temporarily holding receiving tubes 672. The receiving tubes 672 are "frozen" into the backplate 662 by the engineered plastic forming around the periphery of the tube 672 and forming the offset attachment ribs 670 of the backplate system 611. In some embodiments, the plastic of the backplate 662 is formed around about 280° of the tube's 672 circumference creating an undercut. In addition, the normal shrinkage of the thermoforming process during the cooling of the plastic further secures the tube 672. The receiving tubes 672 may be included in the backplate 662 and the backplate cover 664 to form the offset attachment ribs 670. In some embodiments, the backplate cover 664 includes one offset attachment rib 670 and the backplate cover 664 extends across the disconnect hanger so that an edge 671a of the backplate cover 664 is aligned with an edge 671b of the backplate 662. The offset attachment rib 670 of the backplate cover 664 may be positioned on the same side as a hinge on the disconnect hanger 610b to provide access to the disconnect hanger 610b as described below. In some embodiments, the horizontal offset ribs may include receiving tubes.

In some embodiments, the receiving tube 672 may be formed from a seamless hollow aluminum rod. The receiving tube 672 may first be cut to the proper length for embedment into the backplate 662. One or both ends of the receiving tube 672 may be flared to approximately the thickness of the tube 672 itself. The flaring provides a restriction flange that prevents movement of the receiving tube 672 in all directions. The flaring also allows for the elimination of a sharp tube 672 edge during fabrication. A thick friction tape is added and an o-ring is positioned against the back side of the flare of the tube 672. High quality self-fusing tape is wrapped around the end of the tube 672 covering the o-ring and the friction tape. One or more apertures 642 through the tube 672 may be created that mate with the placement pins 676 of the mold 682. The pins 676 may be positioned to protrude slightly above the tube 672 to prevent lateral movement as the plastic is vacuumed over the mold 682. A small protrusion 684 is created in the finished backplate 662 as a result of the difference between the tube 672 and the pin 676. The apertures 642 may be sized to provide vertical release between the mold surface 674 and the backplate 662. By way of non-limiting example, the apertures 642 may be +/−1/32 of an inch over the O.D. of the tube 672. The mold 682 is designed with about 5°-7° draft on either side of the mold portion 683 that provides the offset attachment ribs 670 to allow the backplate 662 to release from the mold 682 upon reversing to positive air pressure. Other methods of forming the backplate system 611 may also be used. By way of non-limiting example, the backplate system 611 may be injection molded or formed in a 2-part or greater mold system and may not include the receiving tubes in the formation of the offset attachment ribs.

The backplate system 611 may be connected to the reinforcement device 600 prior to the installation on the traffic signal control assembly 610. The vertical members 624 and the lower support device 622 may be connected as described above. The receiving tubes 672 of the backplate 662 are placed over the vertical members 624. The cover 664 is installed by sliding the receiving tube 672 of the cover over one vertical member 624 so that the cover 664 hinges on the same side as the existing disconnect hanger 610b. In some embodiments, the height of the offset attachment rib 670 may be increased or decreased to be compatible with different disconnect hanger and/or traffic signal depths. Stay nuts may be used to prevent vertical movement of the backplate 662 and the cover 664. The upper support device 620 is connected to the vertical members 624 as previously described.

Figures 43, 44:
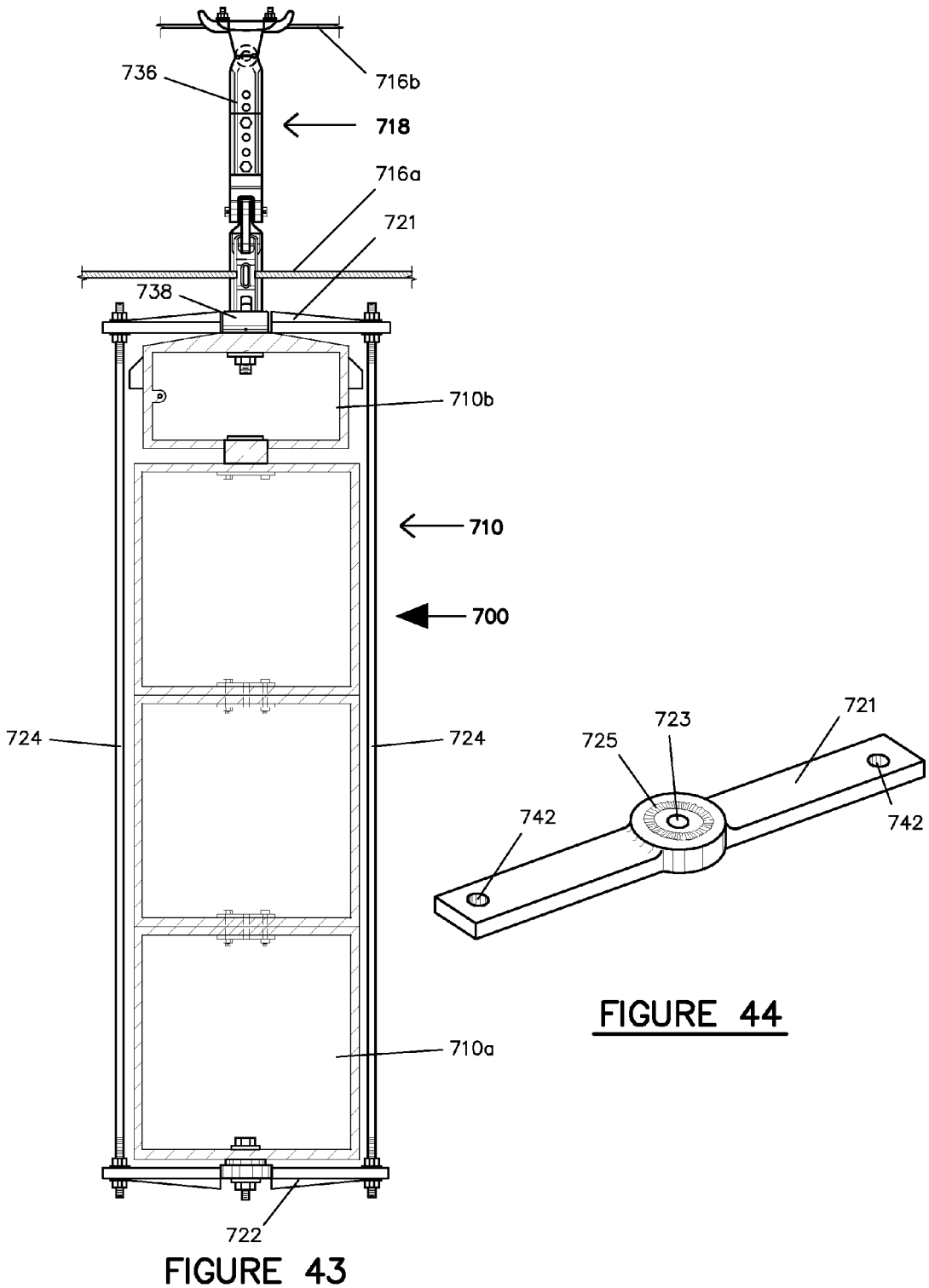
FIG. 43 is a front view of an embodiment of a reinforcement device retrofit onto a traffic signal control assembly.
FIG. 44 is a perspective of an embodiment of an upper support device.

FIG. 43 illustrates an embodiment of a reinforcement device 700 in accordance with the present invention. The reinforcement device 700 includes an upper support device 721, a lower support device 722 and vertical support members 724 extending on opposite sides of a traffic signal 710a of a traffic signal assembly 710. The traffic signal assembly 710 may also include a disconnect hanger 710b. The reinforcement device 700 may be used with a dual span wire system having a lower span wire 716a and an upper span wire 716b as shown in FIG. 43 or a single span wire system with or without a tether as described above. The reinforcement device 700 permits directional rotation of the traffic signal control assembly 710, for example as required for diagonal type intersections. The reinforcement device 700 holds the traffic signal control assembly 710 together vertically in a prescribed amount of compression resulting from the tension on the vertical support members 724 and the upper and lower support devices 721, 722. The lower support device 722 and the vertical members 724 are similar to the corresponding elements described above. The upper support device 721 may be installed between a lower connection device 738 of a connecting assembly 718 and the disconnect hanger 710b as shown in FIG. 43. An exemplary upper support device 721 is shown in FIG. 44. The lower support device 722 may be configured to be formed similar to the upper support device 721 shown in FIG. 44. The upper support device 721 includes openings 742 to secure the vertical support members 724 to the upper support device 721. As shown in FIG. 43, the openings 742 may be spaced so that the vertical support members 724 extend along opposite sides of the traffic signal control assembly 710 without contacting the traffic signal control assembly 710. The upper support device 721 may include one or more central openings 723 and may include serrations 725 to mate with corresponding serrations on the traffic signal disconnect 710b.

A connecting device 718 may be connected to upper and lower span wires 716b, 716a. The connecting device 718 may be any of the connecting devices described herein and shown in FIGS. 17-34. By way of non-limiting example, the connecting devices such as the devices shown in FIGS. 2, 17, 22, 31 may be used with the reinforcement device 700. In some embodiments, the reinforcement system 700 may also include a backplate system 611 and/or the load spreading span wire claim 620 as described above.

Figure 45:
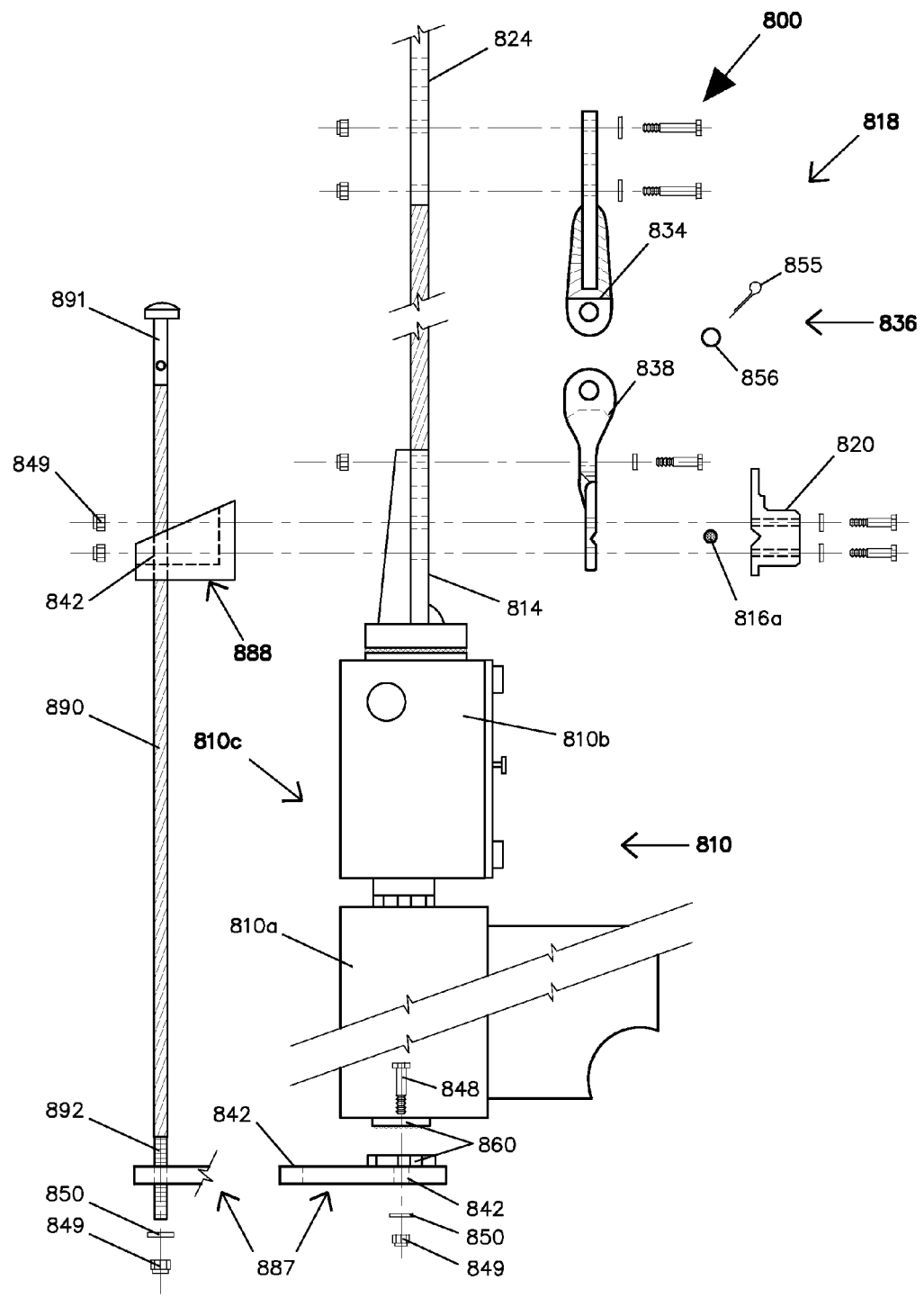
FIG. 45 is an exploded view of an embodiment of a reinforcement device.

FIG. 45 illustrates an embodiment of a reinforcement device 800 in accordance with the present invention. The reinforcement device 800 includes an upper bracket 888, a lower support device 887 and a vertical support member 890 extending between the upper bracket 888 and the lower support device 887. The vertical support member 890 may be positioned along a back side 810c of a traffic signal control assembly 810. In some embodiments, the vertical support member 890 may be provided as at least one cable or rod, although other types of support members may also be used. As shown, the traffic signal control assembly 810 may include a traffic signal 810a and a disconnect hanger 810b. The reinforcement device 800 may be used with a dual span wire system having a lower span wire 816a and an upper span wire 816b or a single span wire system with or without a tether as described above. The reinforcement device 800 holds the traffic signal control assembly together vertically in a prescribed amount of compression resulting from the vertical support member 890 and the upper bracket 888 and lower support device 887 being connected together. A connecting assembly 818 may also be provided. The connecting assembly 818 includes an upper connection device 834, a linking device 836 and a lower connection device 838. The lower connection device 838 may include an integral span wire engagement plate similar to the devices described above.

The reinforcement device 800 may include an upper support device 820 that is similar to the load spreading clamp 620 described above. The upper bracket 888 may be connected to the vertical support member 890 through an opening 842 in the bracket 888. The bracket 888 may also be connected to an existing hanger 814. The lower support device 887 may also be connected to the vertical support member 890 through an opening 842 in the lower support device 887. The lower support device 887 also may be connected to the traffic signal 810a by aligning mutual serrations 860 on the support device 887 with serrations on the traffic signal 810a. A bolt 848 may be inserted through another opening 842 in the lower support device 887 and secured with a washer 850 and a lock nut 849. In some embodiments, the vertical support member 890 may include threaded end 892 that may be extending through the openings 842 in the upper bracket 888 and the lower support device 887 until a bolt 891 opposite the threaded end 890 contacts the upper bracket 888. The vertical support member 890 may be secured by tightening the vertical support member 890 to the predetermined tension using a washer 850 and a locknut 849. The tension on the reinforcement device 800 provides resistance to wind induced vertical impact loads and provides compressive strength to the traffic signal control assembly's multiple connections to provide increased stability.

FIG. 46 illustrates a temporary suspension device 900 for span wire supported traffic signal control assembly retrofitting. The suspension device 900 allows for retrofitting a traffic signal control assembly with a reinforcement device without needing to tie the traffic signal control assembly to a bucket truck and or utilize adjustable type tie-down straps. The suspension device 900 includes a lateral support member 944 that extends generally parallel to the span wire 912. An opening 942 may be centrally positioned on the lateral support member 944. A pair of arms 946 extend from the lateral support member and each arm 946 includes an angled flange 902 at an end 904 of each arm 946. The suspension device 900 may be installed by hooking the span wire 912 into the angle flanges 902 and fastening the suspension device 900 to the existing hanger 920 using a bolt 948 inserted through the central opening 942 and temporarily securing the suspension device 900 to the hanger 920 using a nut 949. Once the reinforcement device of the present invention has been secured to the hanger, the suspension device 900 can be removed. The suspension device 900 may be used with any of the reinforcement devices described herein.

In some embodiments of the present invention, a computer modeling or finite element analysis demonstrates an increase in strength of at least about 90 percent over existing, non-retrofitted traffic signal assemblies when tested at wind speeds of up to 140 miles per hour. Desirable embodiments also substantially extend the life span of already fatigued existing traffic signal assemblies.

When compared with existing, non-retrofitted traffic signal assemblies, some embodiments of the present invention exhibit a reduction of about 95 percent in known failure areas in the signal head, the disconnect hanger, and the connection device above the disconnect hanger when exposed to above 75 mile per hour winds. For example, such an improvement has been shown for embodiments of the present invention in which an existing traffic signal assembly suspended from dual span wires is retrofitted with stiffening members and connection devices. Improvements of at least about 70, 80, or 90 percent may also be obtained for other embodiments of the present invention in which a traffic control assembly is retrofitted with stiffening members, connection devices, and/or clamping assemblies.

Information on cyclical loading for a comparison of embodiments of the present invention with existing, non-retrofitted traffic signal assemblies may be obtained from "Structural Qualification Procedure for Traffic Signals and Signs" by Ronald Cook, David Bloomquist, and J. Casey Long of the University of Florida College of Engineering, Department of Civil Engineering. The various forces exerted on a traffic control assembly may be analyzed by: developing a balanced free body diagram of the assembly, including forces or reactions associated with the span wires, wind loading, and the weight of the assembly; performing a static analysis of the assembly using the forces from the balanced free body diagram (e.g., using ANSYS finite element analysis software); and comparing the stresses obtained in the static analysis with stress limits for the materials in question.

Although the examples and illustrations set forth herein are primarily directed to traffic signals suspended by span wires, other traffic control assembly configurations, such as suspended sign assemblies, are also contemplated by the present invention. The embodiments of the present invention disclosed herein may be configured to accommodate many different shapes, sizes, and types of traffic control devices, as well as their associated electrical components, mechanical components, connecting mechanisms, and support structures.

It is therefore intended that the foregoing detailed description be regarded as illustrative rather than limiting, and that it be understood that it is the following claims, including all equivalents, that are intended to define the spirit and scope of this invention.

The invention claimed is:

1. A reinforcement device for a traffic control assembly, the traffic control assembly including a traffic signal disconnect hanger and/or a traffic signal, a lower span wire, an upper span wire, the upper span wire positioned above and supporting the traffic control assembly and a span wire clamp assembly including a pivot connected to the upper span wire, and having a pivot axis perpendicular to the upper span wire, the reinforcement device comprising:
   a connecting device operably connectable to and positionable above the traffic control assembly and below the upper span wire, the connecting device comprising:
      an upper connection device operably connectable to the span wire clamp assembly, the upper connection device having a first width measured across a face of the upper connection device;

a lower connection device operably connected to the upper connection device, the lower connection device positionable above and operably connectable to the traffic control assembly, the lower connection device comprising a span wire engagement plate, the span wire engagement plate having a second width measured across a face of the span wire engagement plate that is connectable to the lower span wire, the second width being greater than the first width; and a linking device connecting the upper connection device to the lower connection device so that the upper connection device is movable relative to the lower connection device.

2. The reinforcement device of claim 1, wherein the span wire engagement plate is integrally formed with the lower connection device.

3. The reinforcement device of claim 1, wherein the span wire engagement plate comprises a groove configured to receive at least a portion of the lower span wire.

4. The reinforcement device of claim 1, wherein the upper connection device comprises a v-shaped mating groove, the lower connection device comprises a v-shaped mating groove or both the upper and the lower connection devices comprise a v-shaped mating groove.

5. The reinforcement device of claim 1, wherein the upper connection device comprises an integral reinforcement, the lower connection device comprises an integral reinforcement or both the upper connection device and the lower connection devices comprise an integral reinforcement.

6. A reinforcement device for holding a traffic control assembly in compression, the traffic control assembly including a traffic signal disconnect hanger and/or a traffic signal, and a first span wire positioned above the traffic control assembly, the reinforcement device comprising:

an upper support device directly connectable to the first span wire, the upper support device having a width that is greater than a width of the traffic control assembly, the upper support device configured to spread the load of the traffic signal assembly to the first span wire;

a lower support device operably connectable to the traffic signal;

a first vertical support member; and a second vertical support member, each of the first and second vertical support members having a first end portion operably connected to the upper support device and a second end portion operably connected to the lower support device;

wherein the first and second vertical members are tensioned when the upper support device, the lower support device and the first and second vertical support members are connected together.

7. The reinforcement device of claim 6, wherein the upper support device further comprises a groove extending at least partially along the length of the upper support device, the groove configured to receive at least a portion of the first span wire therein.

8. The reinforcement device of claim 6, further comprising a span wire engagement plate connectable to the first span wire and the upper support device.

9. The reinforcement device of claim 8, wherein the span wire engagement plate comprises a groove configured to receive at least a portion of the first span wire.

10. The reinforcement device of claim 6, wherein the first and second vertical support members comprise rods or cables.

11. The reinforcement device of claim 6, wherein at least one of the first or second end portions of each of the first and second vertical support members is threaded.

12. The reinforcement device of claim 6, wherein the first and second vertical support members are free from direct contact with the traffic control assembly.

13. The reinforcement device of claim 6, wherein the first and second vertical support members are positioned generally perpendicular to the upper support device.

14. The reinforcement device of claim 6, wherein the lower support member has a width that is greater than the width of the traffic control assembly.

15. The reinforcement device of claim 6, further comprising a connecting device operably connectabe to and positioned above the traffic control assembly and below a second span wire, the connecting device comprising;

an upper connection device operably connectable to the second span wire;

a lower connection device operably connected to the upper connection device and to the traffic control assembly; and a linking device connecting the upper connection device to the lower connection device.

16. The reinforcement device of claim 15, wherein the lower connection device comprises a span wire engagement plate operably connected to the upper support device.

17. The reinforcement device of claim 15, wherein at least one of the upper connection device and the lower connection device comprises reinforcement flanges.

18. The reinforcement device of claim 6, further comprising a backplate system that is connected to the reinforcement device, wherein the backplate system extends around at least three sides of the traffic signal.

19. The reinforcement device of claim 18, wherein the backplate system comprises:

a backplate comprising three sides of a face of the backplate system;

a cover comprising a fourth side of the face; the cover being pivotable relative to the backplate;

a first offset attachment rib extending along and offset from one of the three sides of the face of the backplate; and a second offset attachment rib extending and offset from another of the three sides of the face of the backplate.

20. The reinforcement device of claim 18, further comprising a first receiving tube positioned in the first offset attachment rib and a second receiving tube positioned in the second offset attachment rib.

21. The reinforcement device of claim 18, wherein the backplate system is configured for use with a traffic control assembly including a disconnect hanger and the cover is pivotable to provide access to the disconnect hanger and the cover is securable in a dosed position with a latch.

22. A reinforcement device for holding a traffic control assembly in compression, the traffic control assembly including a traffic signal disconnect hanger and/or a traffic signal and a first span wire positioned above the traffic control assembly and supporting the traffic control assembly and a span wire clamp assembly including a pivot connected to the first span wire and having a pivot axis perpendicular to the first span wire, the reinforcement device comprising:

an upper support device having a width that is greater than a width of the traffic control assembly, the upper support device being operably connectable to the traffic control assembly;

a lower support device operably connectable to the traffic signal;

a first vertical support member; and a second vertical support member, each of the first and second vertical support members having a first end portion operably connected to the upper support device and a second end portion operably connected to the lower support device;

wherein the first and second vertical members are tensioned when the upper support device, the lower support device and the first and second vertical support members are connected together.

23. The reinforcement device of claim 22, further comprising a connecting device operably connectable to and positioned above the traffic control assembly and below a second span wire, the connecting device comprising:

an upper connection device operably connectable to the second span wire;

a lower connection device operably connected to the upper connection device and to the upper support device; and a linking device connecting the upper connection device to the lower connection device.

24. The reinforcement device of claim 22, further comprising a backplate system that is connected to the reinforcement device, wherein the backplate system extends around at least three sides of the traffic signal.

* * * * *

UNITED STATES PATENT AND TRADEMARK OFFICE
CERTIFICATE OF CORRECTION

| | |
|---|---|
| PATENT NO. | : 8,659,445 B2 |
| APPLICATION NO. | : 13/888894 |
| DATED | : February 25, 2014 |
| INVENTOR(S) | : Robert E. Townsend, Jr. |

It is certified that error appears in the above-identified patent and that said Letters Patent is hereby corrected as shown below:

In the Claims

In column 30, claim 21, line 52, after "cover is securable in a" replace "dosed" with --closed--.

Signed and Sealed this
Twelfth Day of April, 2016

Michelle K. Lee
*Director of the United States Patent and Trademark Office*